United States Patent [19]

Sakaue et al.

[11] Patent Number: 5,384,896
[45] Date of Patent: Jan. 24, 1995

[54] LEARNING MACHINE

[75] Inventors: Shigeo Sakaue, Takarazuka; Toshiyuki Kohda, Takatsuki; Hiroshi Yamamoto, Katano; Yasuharu Shimeki, Suita, all of Japan

[73] Assignee: Matsushita Electric Industrial Co., Ltd., Osaka, Japan

[21] Appl. No.: 143,241

[22] Filed: Oct. 22, 1993

Related U.S. Application Data

[63] Continuation of Ser. No. 800,592, Nov. 27, 1991, abandoned.

[30] Foreign Application Priority Data

Nov. 29, 1990 [JP] Japan .................................. 2-335092
May 17, 1991 [JP] Japan .................................. 3-112992

[51] Int. Cl.⁶ ............................................. G06G 7/12
[52] U.S. Cl. ............................................. 395/24; 395/20; 395/21; 395/23; 395/27
[58] Field of Search .................. 395/11, 24, 27, 10, 395/11, 20, 21, 23, 24, 27, 77

[56] References Cited

U.S. PATENT DOCUMENTS

| | | | |
|---|---|---|---|
| 4,874,963 | 10/1989 | Alspector | 395/24 |
| 5,010,512 | 4/1991 | Hartstein et al. | 395/24 |
| 5,039,871 | 8/1991 | Engeler | 395/24 |
| 5,056,037 | 10/1991 | Eberhardt | 395/24 |
| 5,058,179 | 10/1991 | Denker et al. | 395/24 |
| 5,063,601 | 11/1991 | Hayduk | 395/24 |
| 5,067,095 | 11/1991 | Peterson et al. | 395/24 |
| 5,073,867 | 12/1991 | Murphy et al. | 395/27 |
| 5,095,443 | 3/1992 | Watanabe | 395/24 |
| 5,109,351 | 4/1992 | Simar, Jr. | 395/24 |
| 5,142,666 | 8/1992 | Yoshizawa et al. | 395/24 |
| 5,146,542 | 9/1992 | Engeler | 395/24 |
| 5,148,514 | 9/1992 | Arima et al. | 395/24 |
| 5,187,680 | 2/1993 | Engeler | 395/24 |
| 5,216,746 | 6/1993 | Yoshizawa et al. | 395/24 |
| 5,220,559 | 6/1993 | Tsuzuki et al. | 395/27 |
| 5,293,457 | 3/1994 | Arima et al. | 395/24 |

FOREIGN PATENT DOCUMENTS 0349819 1/1990 European Pat. Off. .

OTHER PUBLICATIONS

Moors et al, "Cascading Content-Adressable Memories"; IEEE Micro, vol. 12, iss. 3, pp. 56–66, Jun. 1992.
M. Yasunaga et al., "Design, Fabrication and Evaluation of a 5-Inch Wafer Scale Neural Network LSI Composed of 576 Digital Neurons", IJCNN International Joint Conference on Neural Networks, vol. 2, pp. 527–535 (Jun. 1990).
W. Wike et al., "The VLSI Implementation of STONN", IJCNN International Joint Conference on Neural Networks, vol. 2, pp. 593–598 (Jun. 1990).

Primary Examiner—Allen R. MacDonald
Assistant Examiner—Tariq Hafiz
Attorney, Agent, or Firm—Ratner & Prestia

[57] ABSTRACT

A learning machine with multi-input single-output circuits connected in hierachical structure, wherein product-sums of the output signals of input and output signal registers and the weights are obtained by the parallel processing of a plurality of product-sum computing units with a plurality of input and output signal registers being connected in cascades, thereby to render to scale down the circuit of the learning machine with the sigmoid function computing unit being one in number.

3 Claims, 16 Drawing Sheets

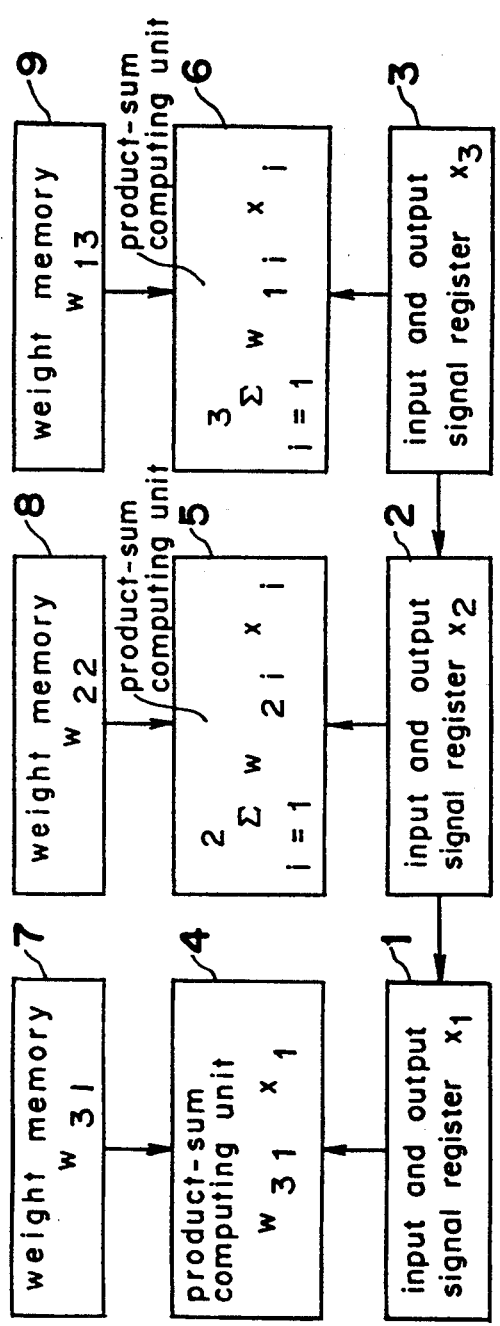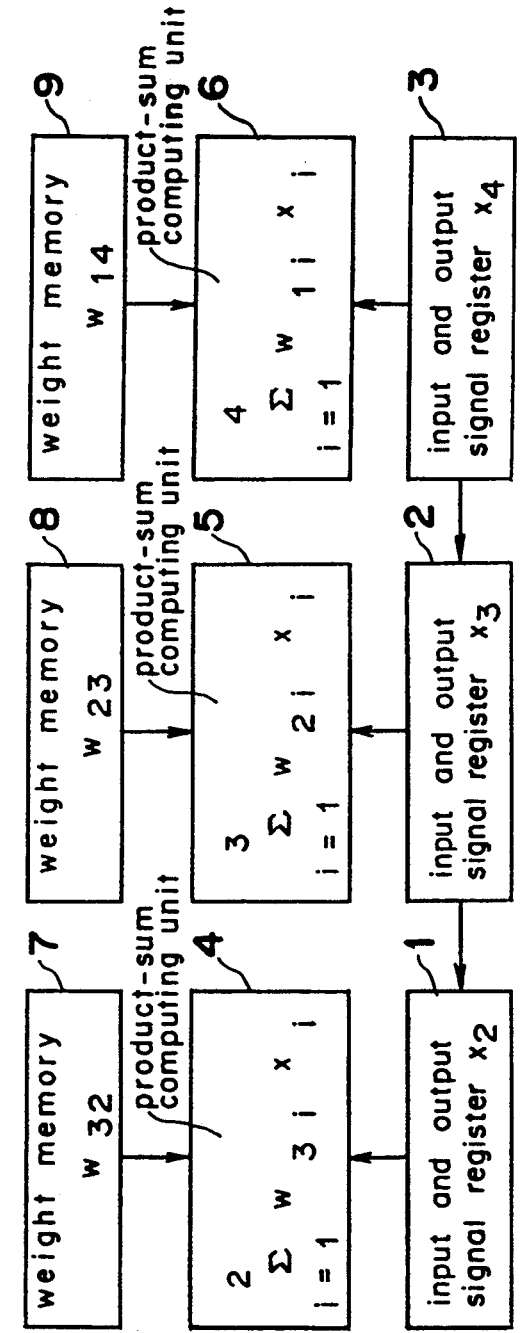
Fig. 3 (c)
Fig. 3 (d)

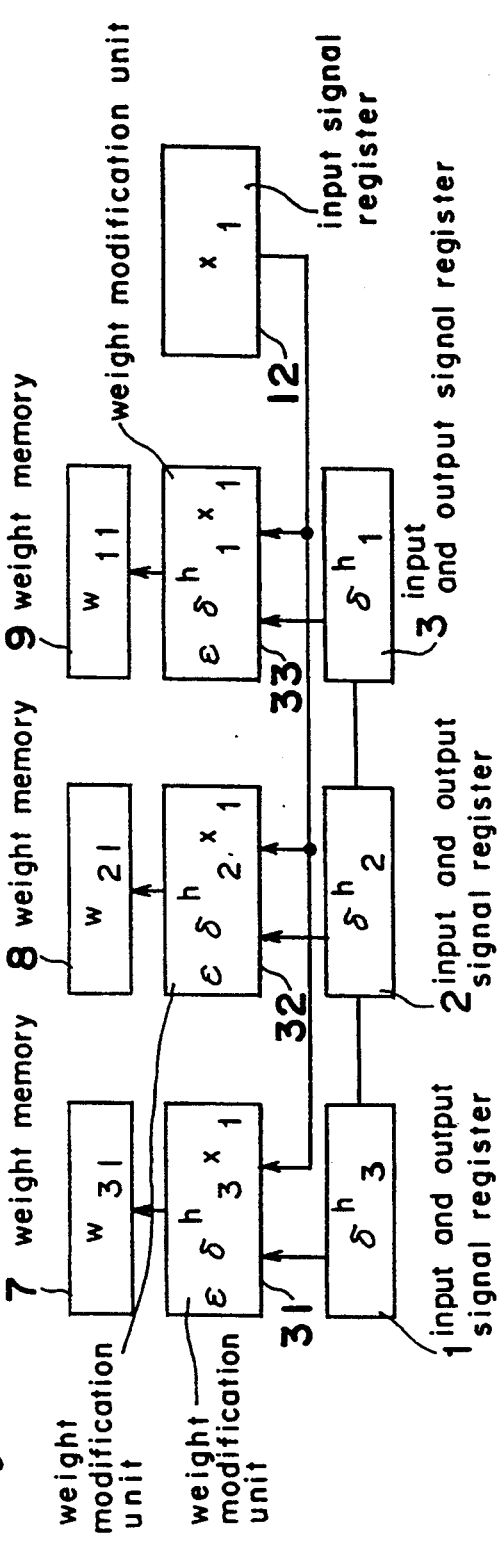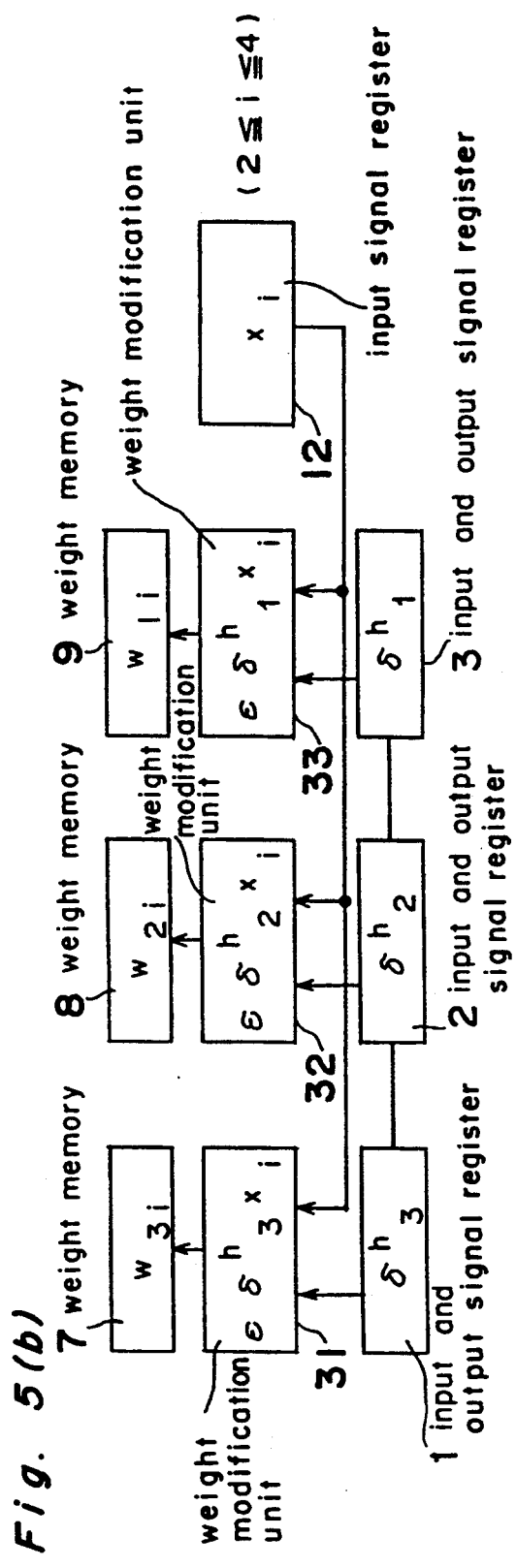

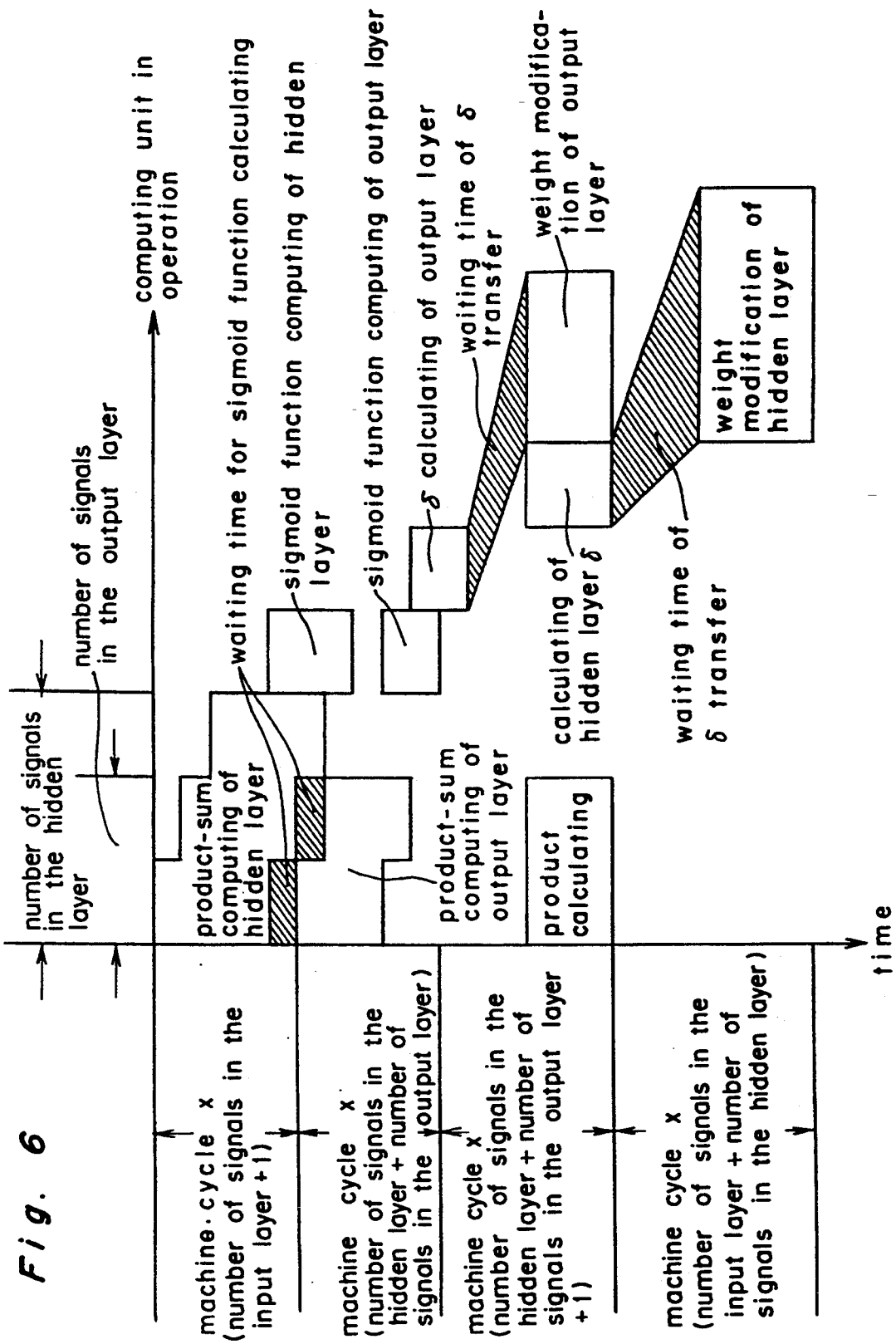

LEARNING MACHINE

This application is a continuation of application Ser. No. 07/800,592 filed Nov. 27, 1991 now abandoned.

BACKGROUND OF THE INVENTION

The present invention generally relates to a learning machine for a data processing apparatus.

As the conventional learning machine is shown, for example, "A Parallel Neurocomputer Architecture toward Billion Connection Updates Per Second", International Joint Conference on Neural Network (January 1990).

FIG. 9 shows a block diagram of the conventional learning machine, which includes input and output signal registers 51, 52, 53 and 54, product-sum and sigmoid function computing units 55, 56 and 57, weight memories 58, 59 and 60 and ring length controlling units 61, 62 and 63. FIG. 10 shows a model of a learning machine to be realized with a structure shown in FIG. 9. In FIG. 10, reference numerals 64, 65, 66 and 67 are input terminals, reference numerals 68, 69, 70, 71 and 72 show multi-input single-output circuits, reference numeral 73 is an input layer, reference numeral 74 is a hidden layer, reference numeral 75 is an output layer. As shown in FIG. 10, a learning machine can be expressed in a model with a multi-input single-output circuits connected in hierachical structure. A layer composed of multi-input single-output circuits for outputting output signals from among multi-input single-output circuits connected in hierachical structure is called an output layer. Layers composed of multi-input single-output circuits excluding the output layer are called hidden layers. A layer composed of input terminals is called an input layer. Generally the hidden layer may be composed of multi-input single-output circuits constituting one layer, or may be composed of multi-input single-output circuits constituting a plurality of layers. FIG. 10 shows a case where the hidden layer is composed of multi-input single-output circuits constituting one layer. Generally the input terminals for constituting an input layer may be arbitrary in number. The multi-input single-output circuits for constituting the hidden layer and the output layer may be arbitrary in number. FIG. 10 shows a learning machine composed of a structure where the input layer 73 is composed of four input terminals, the hidden layer 74 is composed of three multi-input single-output circuits and the output layer 75 is composed of two multi-input single-output circuits. The multi-input single-output circuits 68, 69, 70, 71 and 72 of the respective layers output signals each having a saturation characteristic with respect to the sum of these products with individual weight being multiplied respectively by a plurality of input signals. Namely, an output signal $Y_j$ of a j-th multi-input single-output circuit is expressed by $$Y_j = \text{fnc}\left(\sum_i (W_{ji} X_i)\right) \quad (1)$$

Here $X_i$ is an output signal of an i-th multi-input single-output circuit in the proceeding layer. $W_{ji}$ is a weight to be multiplied when the output signal of an i-th of multi-input single-output circuit in the proceeding layer is inputted into the j-th multi-input single-output circuit. fnc ( ) is a sigmoid function having a saturation characteristic, and outputs for example $$\text{fnc}(X) = \frac{2}{1 + \exp(-X)} - 1 \quad (2)$$

with respect to X.

In a block diagram of the conventional learning machine of FIG. 9, the weight memories 58, 59 and 60 store the weights to be multiplied in the multi-input single-output circuits 68, 69, 70, 71 in a model of FIG. 10. Input and output signal registers 51, 52, 53 and 54 store signals to be inputted from input terminals 64, 65, 66 and 67 or output signals of multi-input single-output circuits 68, 69, 70, 71 and 72. As a signal stored in the input and output signal register 54 is transferred to the input and output signal register 53 at the next machine-cycle and a signal stored in the input and output signal register 53 is transferred to the input and output signal register 52 at the next machine-cycle, signals stored in the input and output signal registers 51, 52, 53 and 54 are transferred in a sequence. A product-sum and sigmoid function computing units 55, 56 and 57 obtain a product-sum between weights stored in the weight memories 58, 59 and 60 and signals stored in the input and output signal registers 51, 52 and 53 so as to output a signal having a saturation characteristic with respect to product-sum in accordance with the (formula 2). The output signals of the product-sum and sigmoid function computing units 55, 56 and 57 are stored in the input and output signal registers 51, 52, 53 and 54. The ring length controlling units 61, 62 and 63 adjust the number of the input and output signal registers for transferring the stored signals in accordance with the number of the input signals and the number of the multi-input single-output circuits for constituting the hidden layer 74. Namely, in computing the product-sum of the multi-input single-output circuits of the hidden layer 74 the ring length is adjusted in the ring length controlling units 61, 62 and 63 so that the transfer operation of the signals among the input and output signal registers 51, 52, 53 and 54, as the number of the input signals is four. In computing the product-sum of the multi-input single-output circuits of the output layer 75, the ring length is adjusted in the ring length controlling units 61, 62 and 63 so that the signals are transferred among the input and output signal registers 51, 52 and 53, as the number of the multi-input single-output circuits of the hidden layer 74 is three.

FIG. 11 shows a block diagram of a product-sum and sigmoid function computing units 55, 56 and 57. In FIG. 11, reference numeral 76 is a multiplier, reference numeral 77 is a product-sum register, reference numeral 78 is an addition unit, reference numeral 79 is a sigmoid function computing element, reference numeral 80 is an input signal terminal and reference numeral 81 is an output signal terminal, reference numeral 82 is an input terminal of weights. The operations of the product-sum and sigmoid function computing units 55, 56 and 57 are shown hereinafter. A signal stored in the product-sum register 77 is initiated with zero. The multiplier 76 outputs to an addition unit 78 a product of a signal to be inputted from the input signal terminal 80 by a weight to be inputted from an input terminal of weights 82. The addition unit 78 obtains the sum of a product stored in the multiplication unit 76 outputs and a product-sum the product-sum register 77 so as to output it to a product-sum register 77. By repetition of an operation for obtaining such product and sum, a product-sum of signals to be inputted from the input signal terminal 80 and weights to be inputted from the input terminal of weights 82 is stored in the product-sum register 77. When the product-sum operation is completed, the sigmoid function computing element 79 outputs a signal having a saturation characteristic given in the (formula 2) with respect to a signal stored in the product-sum register 77. Therefore, a signal given in the (formula 2) is outputted from the output signal terminal 81.

FIG. 12 is a diagram for illustrating a parallel processing of the product-sum and sigmoid function computing units 55, 56 and 57 in obtaining the outputs of the multi-input single-output circuits 68, 69 and 70 of the hidden layer 74. In FIG. 12, $X_i$ ($1 \leq i \leq 4$) is an input signal, $W_{ji}$ ($1 \leq i \leq 4$, $1 \leq j \leq 3$) is a weight to be multiplied by an input signal $X_i$ in a j-th multi-input single-output circuit of a hidden layer 74. In order to obtain the outputs of the multi-input single-output circuits 68, 69 and 70 of the hidden layer 74, the ring length is adjusted by the ring length controlling units 61, 62 and 63 so that the transfer of the signals may be effected among the input and output signal registers 51, 52, 53 and 54. At first, input signals $X_i$ ($1 \leq i \leq 4$) are loaded to the input and output signal registers 51, 52, 53 and 54. The product-sum registers of the product-sum and sigmoid function computing units 55, 56 and 57 are initiated with zero. The parallel processing of the product-sum and sigmoid function computing units 55, 56 and 57 at the next machine.cycle is shown in the (a) of FIG. 12. The product-sum and sigmoid function computing unit 55 obtains a product of a weight $W_{11}$ stored in a weight memory 58 by an input signal $X_1$ to be stored in an input and output signal register 51 so as to store it in its product-sum register. At the same time, the product-sum and sigmoid function computing unit 56 obtains of a product of $W_{22}$ by $X_2$, and the product-sum and sigmoid function computing unit 57 obtains a product of $W_{33}$ by $X_3$ so as to store them in the respective product-sum registers. The parallel processing of the product-sum and sigmoid function computing units 55, 56 and 57 at the next machine.cycle is shown in the (b) of FIG. 12. Signals stored in the input and output signal registers 51, 52, 53 and 54 are transferred in a sequence. The product-sum and sigmoid function computing unit 55 obtains a product $W_{12}X_2$ of a signal $X_2$ stored in the input and output signal register 51 by a weight $W_{12}$ stored in a weight memory 58 so as to store in its product-sum register the sum with $W_{11}X_1$ shown in the (formula 3).

$$\sum_{i=1}^{2} W_{1i}X_i \quad (3)$$

At the same time, the product-sum and sigmoid function computing portions 56 and 57 respectively store in the product-sum register the product-sum shown in the (formula 4).

$$\sum_{i=2}^{3} W_{2i}X_i \text{ and } \sum_{i=3}^{4} W_{3i}X_i \quad (4)$$

Likewise, in the following machine.cycles the signals stored in the input and output signal registers 51, 52, 53 and 54 are transferred in a sequence. The product-sum and sigmoid function computing units 55, 56 and 57 obtain product-sum of the weights stored in the weight memories 58, 59 and 60 by the signals stored in the input and output signal registers 51, 52, 53 and 54. Namely, the product-sum and sigmoid function computing units 55, 56 and 57 respectively obtain the product-sum in the first, second and third multi-input single-output circuits of the hidden layer. When the product-sum is obtained, the product-sum and sigmoid function computing units 55, 56 and 57 obtain signals each having a saturation characteristic given in the (formula 2) with respect to product-sum by a sigmoid function computing element so as to output them into the input and output signal registers 51, 52 and 53.

The output signals of the multi-input single-output circuits 68, 69 and 70 of the hidden layer 74 are obtained in a manner described hereinabove and are stored in the input and output signal registers 51, 52 and 53. In obtaining the outputs of the multi-input single-output circuits 71 and 72 of the output layer 75, the ring length is adjusted in the ring length controlling units 61, 62 and 63 so that the signals may be transferred among the input and output signal registers 51, 52 and 53 so as to keep the ring length consistent with the number of output signals (3 in this case) of the hidden layer. In the same way as obtaining of the output signals of the multi-input single-output circuits 68, 69 and 70 of the hidden layer 74, the outputs of the multi-input single-output circuits 71 and 72 of the output layer 75 are obtained by the parallel processing of the product-sum and sigmoid function computing units 55 and 56.

FIG. 13 shows a time chart showing the temporal sequence of the computing unit in the operation in the conventional learning machine. When the product-sum of the multi-input signal-output circuits 68, 69 and 70 of the hidden layer 74 are being obtained, the product-sum and sigmoid function computing units 55, 56 and 57 are in the operation, and the number of the product-sum and sigmoid function computing units operating at this time is in conformity of the number of the multi-input single-output circuits of the hidden layer. Time required to obtain the product-sum of the multi-input single-output circuit 68, 69 and 70 of the hidden layer 74 is machine.cycle × number of signals in the input layer
signals in the input layer  (5)

Then, the sigmoid function of the multi-input single-output circuits of the hidden layer are obtained. The number of the product-sum and sigmoid function computing units operating at this time is equal to that of the multi-input single-output circuits of the hidden layer. When the product-sum of the multi-input single-output circuits 71 and 72 of the output layer 75 is obtained, the product-sum and sigmoid function computing units 55 and 56 are operating. The number of the product-sum and sigmoid function computing units operating at this time is in conformity with that of the multi-input single-output circuits of the output layer. Time required to obtain the product-sum of the multi-input single-output circuits 71 and 72 of the output layer 74 is machine.cycle × number of signals in the hidden
layer  (6)

Then, the sigmoid function of the multi-input single-output circuits of the output layer is obtained. The number of the product-sum and sigmoid function computing units operating at this time is equal to that of the multi-input single-output circuits of the output layer. Time required for the output signal to be obtained from the input signal by the operation is machine.cycle×(number of signals in the input layer+number of signals in the hidden layer)+duration of computing sigmoid function of the hidden layer+duration of computing sigmoid function of the output layer    (7)

Then, the weights of the output layer are modified. The amount of weight modification of the output layer is abtained by the computation in the product-sum and sigmoid function computing units 55 and 56 so as to modify the weights. Further, a back-propagating signal $\delta$ of the hidden layer is obtained. Time required to obtain the weight modification of the output layer and the back-propagating signal $\delta$ of the hidden layer is machine.cycle×number of signals in the hidden layer×3    (8)

The weight modification of the hidden layer is effected by the operation in the product-sum and sigmoid function computing units 55, 56 and 57. The time required to do it is machine.cycle×number of signals in the input layer×2    (9)

Time required for the weight modification to be completed from a time point when the output signal of the output layer was obtained in the manner is machine.cycle×(3×number of signals in the hidden layer+2×number of signals in the input layer)    (10)

In the construction, the product-sum are abtained by the simultaneous operations of the product-sum computing elements number of which is equal to the number of the multi-input single-output circuits of one layer, so the product-sum computing elements are required by plurality equal to the number of the multi-input single-output circuits of the hidden layer or that of the output layer. Thus one of the problems of the PRIOR ART is that it results in larger scale of the circuits.

As the number of the product-sum and sigmoid function computing units for the parallel processing is less than that of the multi-input single-output circuits of the hidden layer or the output layer, the PRIOR ART has a problem that it cannot constitute such a learning machine with a number of multi-input single-output circuits in one layer exceed the number (3 in the conventional embodiment) of the previously prepared product-sum and sigmoid function computing units.

As the calculation of the amount of weight modification, the weight modification, the back-propagating signal $\delta$ of the hidden layer are sequentially carried out in a sequence by the product-sum and sigmoid function computing unit, the PRIOR ART has a problem that time required for the weight modification is long.

SUMMARY OF THE INVENTION

Accordingly, an essential object of a first invention is to provide an improved learning machine smaller in the scale of the circuit, with a sigmoid function computing element being one only.

Another important object of a second invention is to provide a learning machine capable of modifying weights in a shorter time.

Still another object of a third invention is to provide a learning machine capable of realizing with simpler changes arbitrary number of the input signals, arbitrary number of multi-input single-output circuits of the hidden layer or of the output layer.

The first invention is a learning machine which comprises a plurality of input and output signal registers connected in cascades, a plurality of weight memories for storing the weights to be multiplied by the input signals, a plurality of product-sum computing units for outputting product-sum of the output signals of the input and output signal registers by the weights stored in the weight memories, and a single sigmoid function computing unit for outputting signals having a saturation characteristic with respect to each product-sum to be outputted by the product-sum computing unit.

The second invention is a learning machine which comprises a plurality of input and output signal registers connected in cascades, a plurality of weight memories for storing the weights to be multiplied by the input signals, products and product-sum of product-sum computing units for outputting a product of the output signals of the input and output signal registers by the weights stored in the weight memories, a single sigmoid function computing unit for outputting signals each having a saturation characteristic with respect to the product-sum to be outputted by the product-sum computing unit, an output layer $\delta$ outputting unit for computing the back-propagating signal $\delta$ of the output layer dependent on the output signal and the supervising signal of the sigmoid function computing unit, a hidden layer $\delta$ calculating unit for computing the back-propagating signal $\delta$ of the hidden layer dependent on a product to be outputted by the product-sum computing unit, and a weight modification unit for obtaining the amount of weight modification dependent on the output of the input and output signal register, the output of the output layer $\delta$ computing unit and the output of the hidden layer $\delta$ computing unit.

The third invention is a learning machine which is provided, with a single sigmoid function computing unit in the construction of the first or the second invention, consisting of a sigmoid function element for outputting signals each having a saturation characteristic with respect to the input signals, an input selecting element for selecting the output signals of a plurality of product-sums so as to input them into the sigmoid function element and a delay element for delaying proper time the output signal of the sigmoid function element.

In a first invention, with the construction, input signals are transferred in a sequence with an input and output signal register connected in cascades, the weight memories output the weights to be multiplied by the input signals, by the parallel processing of a plurality of product-sum computing units, a product-sum of the signals of the input and output signal registers by the weights stored in the weight memories are obtained. A first product-sum computing unit from among a plurality of product-sum computing units completes the computation of the product-sum at first, and a second product-sum computing unit completes the product-sum computation at the next machine.cycle. A single sigmoid function computing unit sequentially multiplies a product-sum to be outputted from the plurality of product-sum computing units by a function (sigmoid function) having a saturation characteristic calculated by one sigmoid function element. The output signals of the multi-input single-output circuit of the hidden layer obtained in this manner are sequentially loaded to the input and output signal resisters connected in cascades. The product-sum is obtained in a sequence again by the parallel processing of the product-sum computing units. In a single sigmoid function computing unit, the sigmoid functions with respect to the product-sum are obtained in a sequence by one sigmoid function element so as to obtain the output signals of the multi-input single-output circuits of the output layer.

In the second invention, with the construction, the output signals of the multi-input single-output circuits of the hidden layer and the output layer are outputted by a similar operation to that of the first invention about the input and output signal registers, the weight memories and the product-sum computing units and the single sigmoid function computing unit. The output layer δ computing unit obtains a back-propagating signal δ in the multi-input single-output circuit of the output layer so as to sequentially transfer it to the input and output signal resisters connected in cascades. When the back-propagating signal δ of the multi-input single-output circuits of all the output layers are set in the input and output signal registers, the weight memories output weights showing the strength of the connections between a first multi-input single-output circuit of the hidden layer and the multi-input signal-output circuits of the output layer. A plurality of product-sum computing units output products to the hidden layer δ computing unit at the same time. Namely, the products are obtained through the simultaneous multiplication of the back-propagating signals δ of the multi-input single-output circuits of the output layer by weights showing the strength of the connections between a first multi-input signal-output circuit of the hidden layer and the multi-input single-output circuits of the output layer. In the hidden layer δ computing unit, the back-propagating signal δ in the first multi-input single-output circuit of the hidden layer is obtained through the multiplication of the sum of the plurality of products by a differential coefficient of the sigmoid function in the first multi-input single-output circuit of the hidden layer. At the same time, a plurality of weight modification units obtain the amount of modification of the weights showing the strength of the connections between a first multi-input single-output circuit of the hidden layer and the multi-input single-output circuits of the output layer so as to output it to the weight memories. In the weight memories, the amount of weight modification obtained in the weight modification units are added to the weights so as to modify the weights. In this manner, the calculation of δ of the first multi-input single-output circuit of the hidden layer and the modification of weights showing the strength of the connections between the first multi-input single-output circuit of the hidden layer and the multi-input single-output circuits of the output layer are carried out at the same time. Thereafter, by the repetition, the calculation of the back-propagating signal δ of all the multi-input single-output circuits of the hidden layer, and the modification of weights showing the strength of the connections between all the multi-input single-output circuits of the hidden layer and the multi-input single-output circuits of the output layer are carried out. The back-propagating signals δ of the multi-input single-output circuits of the hidden layer is transferred in a sequence to the input and output signal registers connected in cascades. When the back-propagating signals δ of all the multi-input single-output circuits of the hidden layer are set in the input and output signal registers, the weights showing the strength of the connections between the first input signal of the input layer and the multi-input single-out-put circuits of the hidden layer are changed by a plurality of weight modification units and the weight memories. By the repetition thereof, the amount of weight modification showing the strength of the connections between the input signals of the input layer and the multi-input single-output circuits of the hidden layer are obtained.

With the construction, in the third invention, a plurality of product-sum computing units sequentially output the product-sum at each machine.cycle, by the function similar to that of the first invention about the input and output signal registers, the weight memories and the product-sum computing units. In the single sigmoid function computing unit, the input selecting element sequentially selects the outputs of a plurality of product-sum computing units so as to input them to one sigmoid function element. The sigmoid function element outputs a signal having a saturation characteristic with respect to the product-sum input, the delay element delays the output signal of the sigmoid function element by proper time before outputting it. The delay time of the signal in the delay element is decided so that the product-sum of the all the multi-input single-output circuits of the hidden layer are computed in the product-sum computing units in the delay time and that the waiting time of the product computing unit is minimum. The output signals of the multi-input single-output circuits of the hidden layer are loaded in a sequence to the input and output registers connected in cascades after being delayed by proper time in the delay unit as described hereinabove. The output signals of the multi-input single-output circuits of the output layer are obtained in the similar operation for obtaining the output of the multi-input single-output circuits of hidden layer. Any delay time of the signals in the delay unit in this case may be acceptable. Thus, a learning machine with any number of the input signals, the multi-input single-output circuits of the hidden layer, and the output layer may be constituted.

BRIEF DESCRIPTION OF THE DRAWINGS

These and other objects and features of the present invention will become apparent from the following description taken in conjunction with the preferred embodiment thereof with reference to the accompanying drawings, in which;

FIGS. 3a–3d show a schematic diagrams of the parallel processing of a product-sum computing unit in the embodiment;

FIGS. 5a–5b show schematic diagrams of the parallel processing of the weight modification units 31, 32 and 33 in the embodiment;

FIG. 6 is a time chart showing the temporal change of the computing units working in the learning machine of the embodiment;

DETAILED DESCRIPTION OF THE INVENTION

Figure 1:
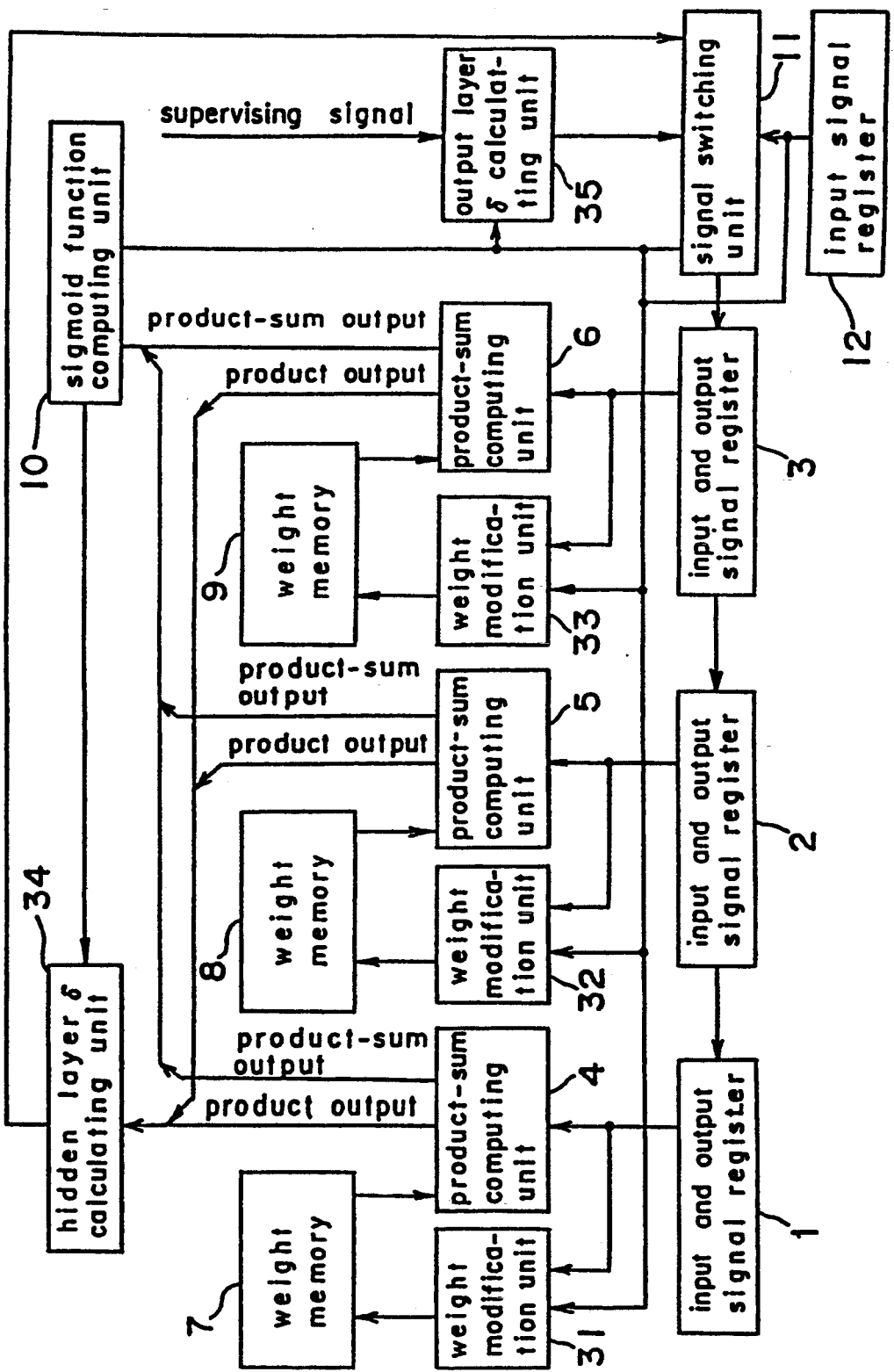
FIG. 1 is a block diagram of a learning machine in an embodiment of the present invention.

Before the description of the present invention proceeds, it is to be noted that like parts are denoted by like reference numerals throughout the accompanying drawings.

Referring now to the drawings, there is shown in FIG. 1, a block diagram of a learning machine according to one preferred embodiment of the present invention, which includes input and output signal registers 1, 2 and 3, product-sum computing units 4, 5 and 6, weight memories 7, 8 and 9, a sigmoid function computing unit 10, a signal switching unit 11, an input signal register 12, weight modification units 31, 32 and 33, a hidden layer δ calculating unit 34, an output layer δ calculating unit 35.

Figure 10:
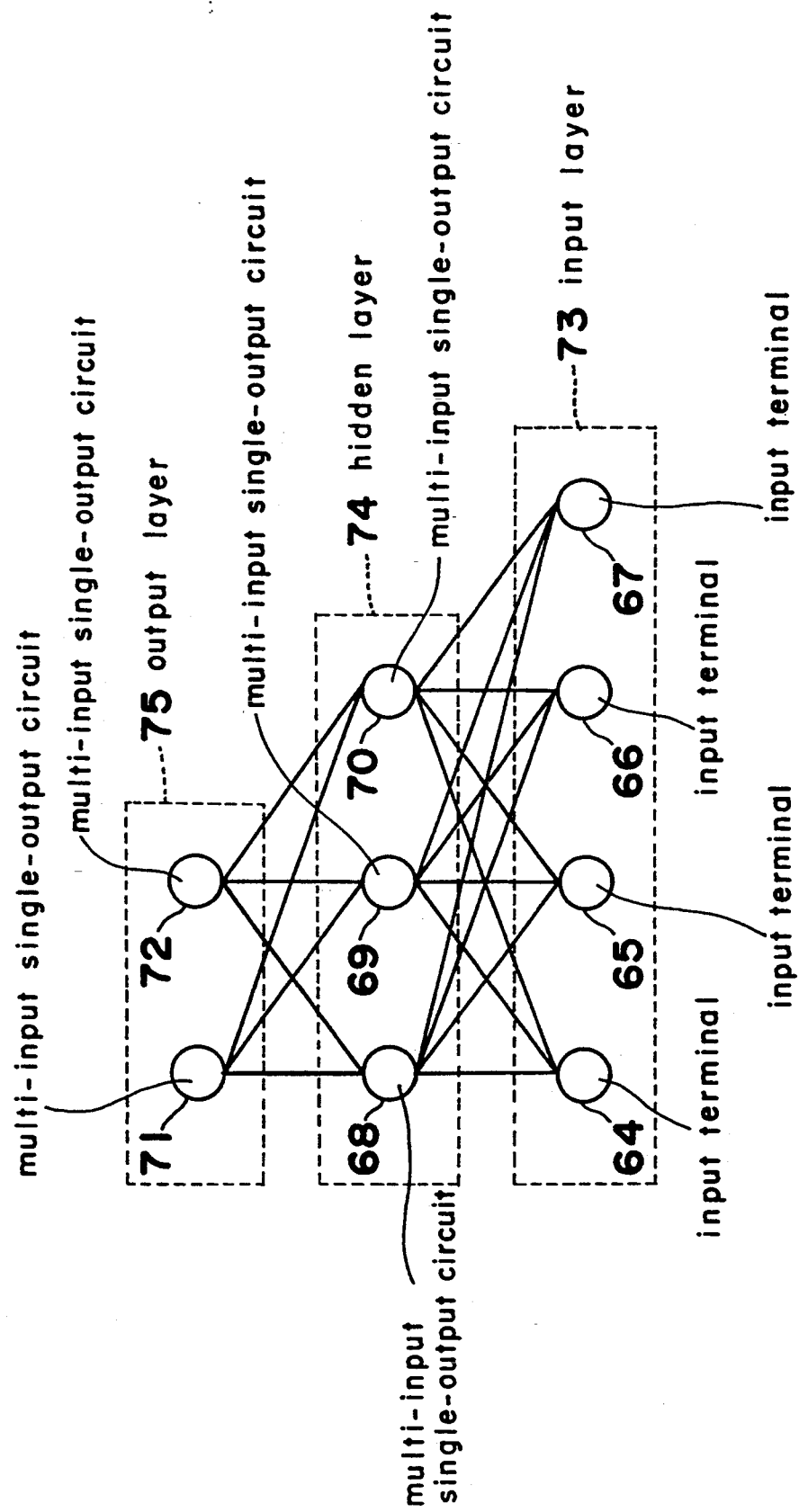
FIG. 10 is a model diagram of a learning machine.
Figure 11:
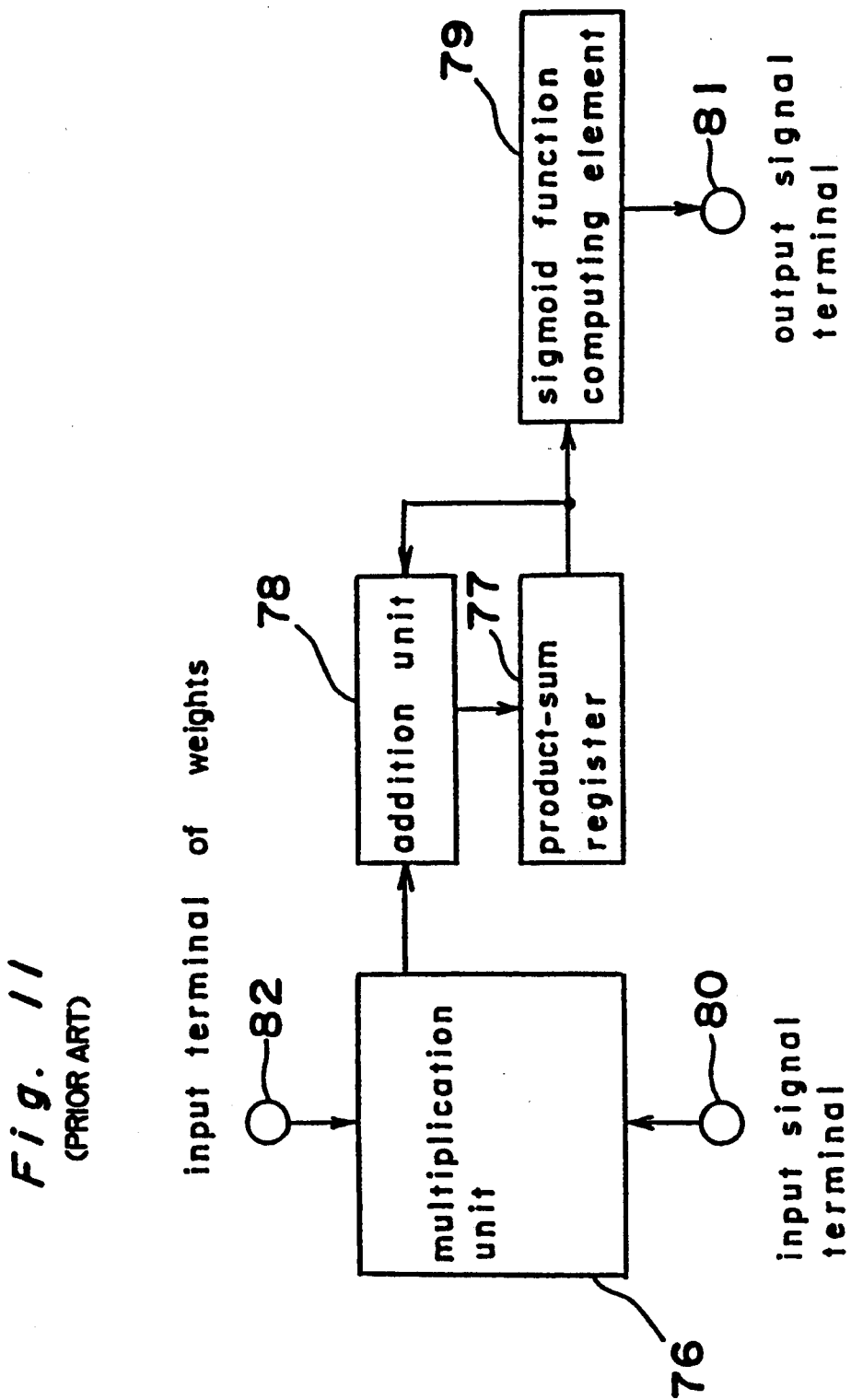
FIG. 11 is a block diagram of the conventional product-sum and sigmoid function computing unit.
Figures 12A, 12B:
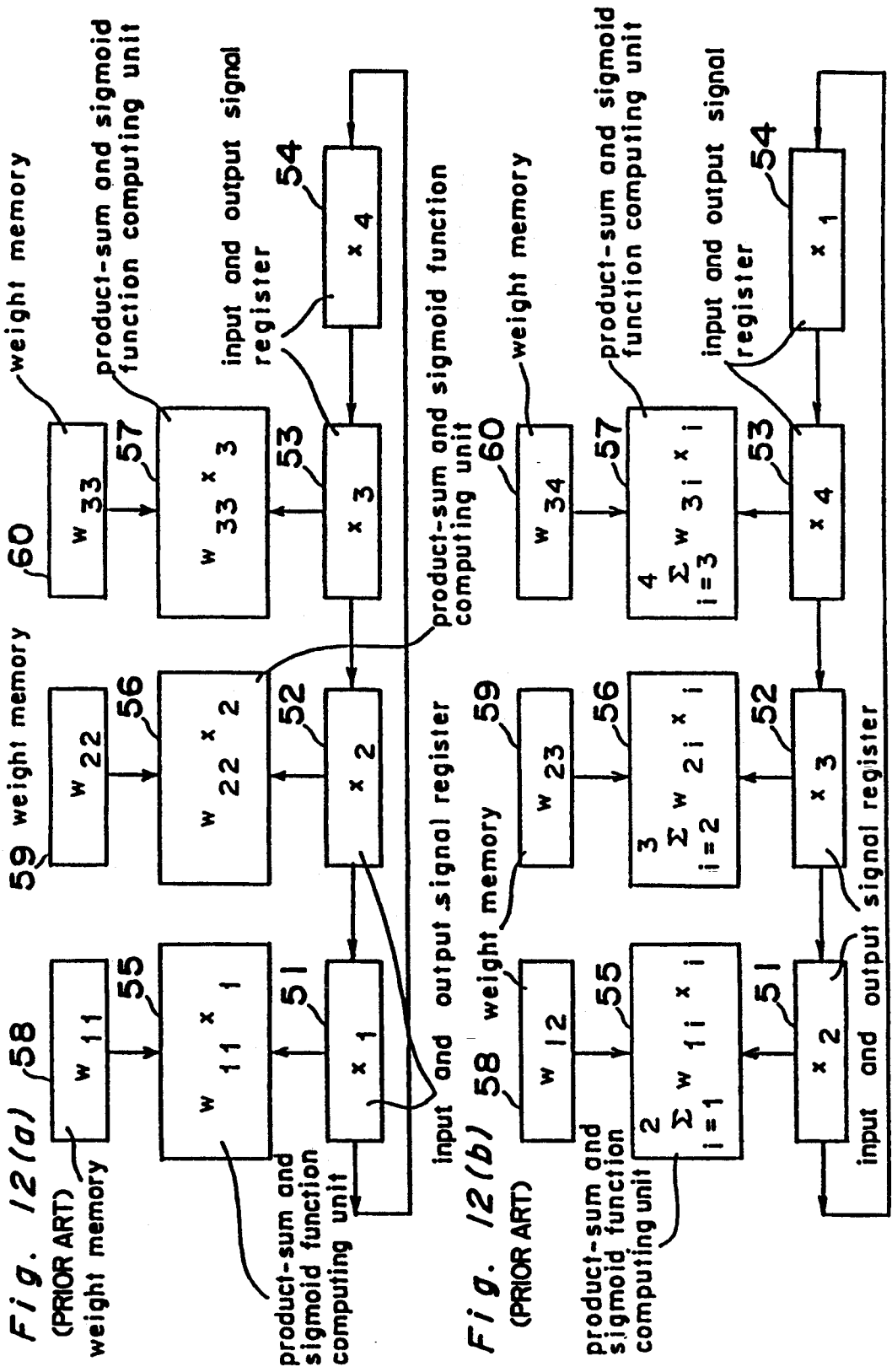
FIGS. 12a–12b show schematic diagrams of the parallel processing of the conventional product-sum and sigmoid function computing units.
Figure 13:
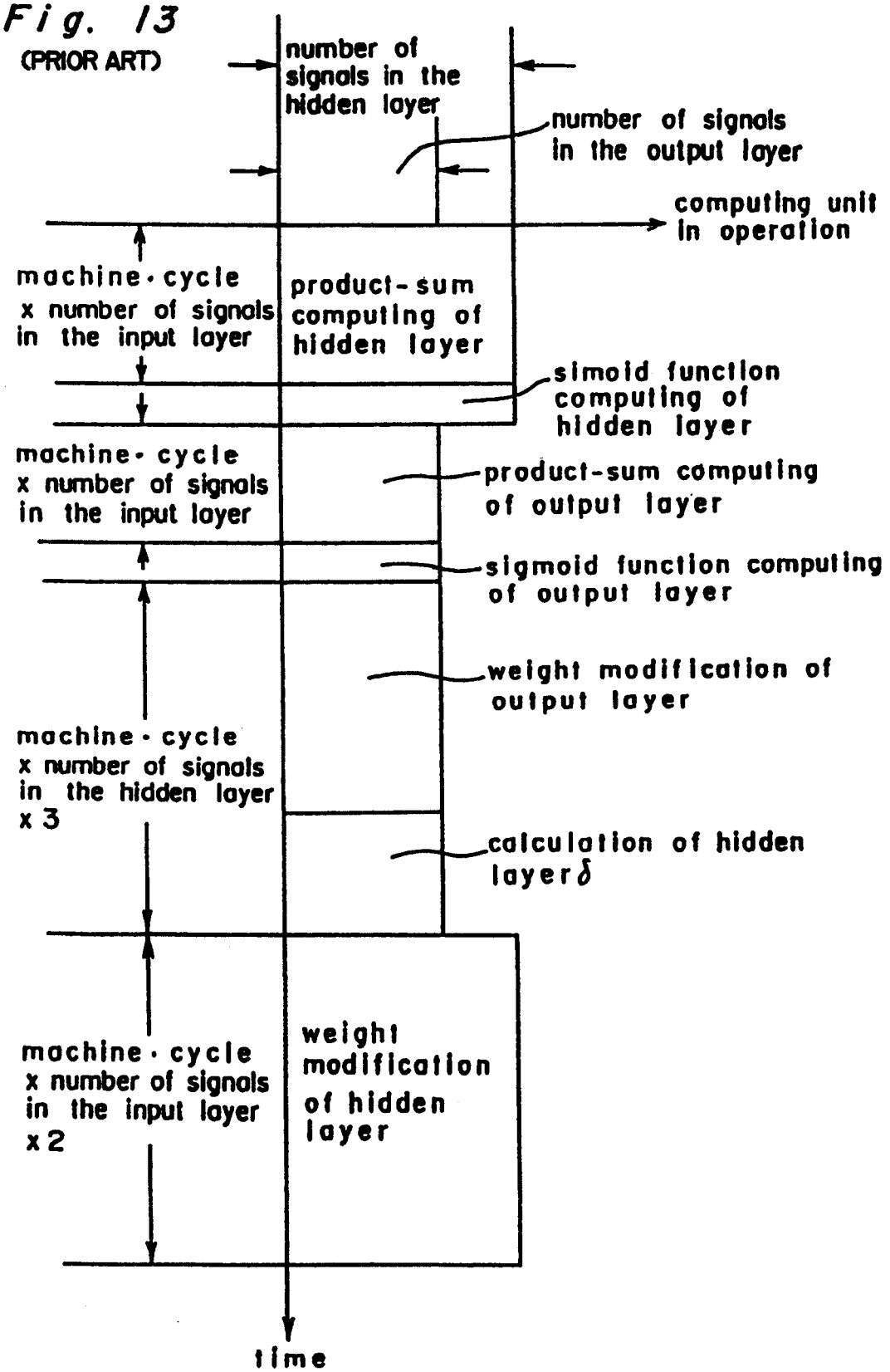
FIG. 13 shows a time chart showing the temporal sequence of the computing unit in the operation in the conventional learning machine.

As shown in FIG. 1, a learning machine in the present embodiment is composed of cascade connections of the input and output signal registers 1, 2 and 3. A model diagram of the learning machine in the present embodiment is shown in FIG. 10. It can be shown in a model with multi-input single-output circuits being connected in hierarchical structure. The present embodiment is a learning machine composed of four input terminals in the input layer 73, three multi-input single-output circuits in the hidden layer 74, two multi-input single-output circuits in the output layer 75. The multi-input single-output circuits 68, 69, 70, 71 and 72 of each layer outputs signals each having a saturation characteristic with respect to the product-sum of a plurality of input signals and corresponding weights.

In the block diagram of the present embodiment of FIG. 1, a weight memory 7 stores the weights to be multiplied by the third multi-input single-output circuit 70 of the hidden layer, a weight memory 8 stores the weights to be multiplied by the second multi-input single-output circuit 69 of the hidden layer and the second multi-input single-output circuit 72 of the output layer and a weight memory 9 stores the weights to be multiplied by the first multi-input single-output circuit 68 of the hidden layer and the first multi-input single-output circuit 71 of the output layer. Signals to be input from the input terminals 64, 65, 66 and 67 are loaded in a sequence into the input signal register 12. The signal switching unit 11 is set so as to transfer the output signal of the input signal register 12 into the input and output signal register 3. The signals stored in the input, output signals registers 3 are transferred into the input and output signal register 2 at the next machine.cycle and the signals stored in the input and output signal register 2 are transferred into the input and output signal register 1 at the next machine.cycle. In this manner, the signals stored in the input and output signal registers 3, 2 and 1 are transferred in a sequence. The product-sum computing units 4, 5 and 6 obtain a product-sum of the weights stored in the weight memories 7, 8 and 9 and the signals stored in the input and output signal registers 1, 2 and 3. The sigmoid function computing unit 10 outputs a signal having a saturation characteristic in accordance with the (formula 1) with respect to a product-sum the product-sum computing units 4, 5 and 6 output. The output signals of the sigmoid function computing unit 10 are output to a signal switching function 11. At this time, a signal switching unit 11 is set to transfer the output of the sigmoid function computing unit 10 into the input and output signal register 3.

Figure 2:
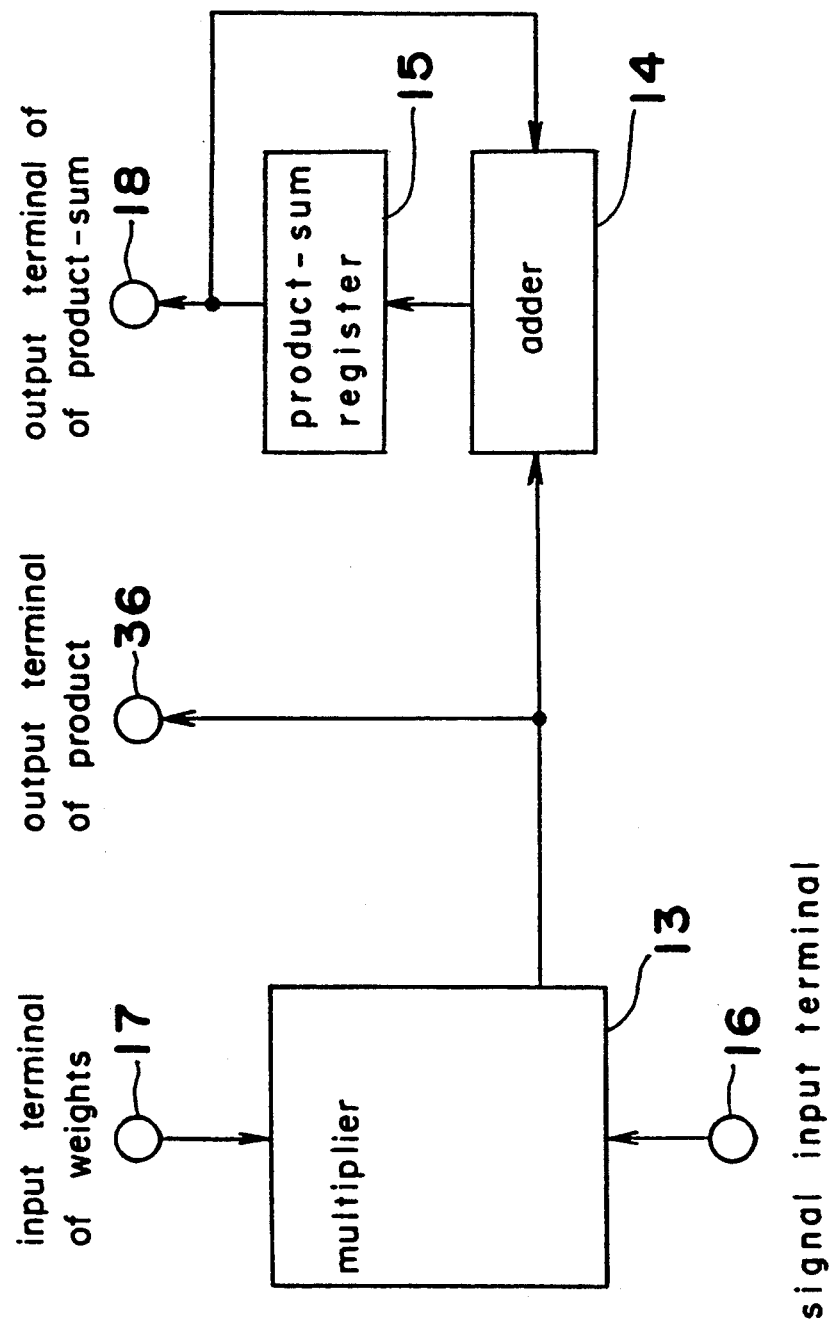
FIG. 2 is a block diagram of a product-sum computing unit in the embodiment.

FIG. 2 shows a block diagram of product-sum computing units 4, 5 and 6. In FIG. 2, reference numeral 13 is a multiplier, reference numeral 14 is an adder, reference numeral 15 is a product-sum register, reference numeral 16 is a signal input terminal, reference numeral 17 is an input terminal of weights, reference numeral 18 is an output terminal of product-sum, and reference numeral 36 is an output terminal of products. The operations of the product-sum computing units 4, 5 and 6 are shown hereinafter. The signal stored in the product-sum register 15 is initialized with zero. The multiplier 13 outputs to the adder a product of the signals to be input from the signal input terminal 16 and the weights input from the input terminal of weights 17. The adder 14 obtains the sum of the product output from the multiplier 13 and the product-sum stored in the product-sum register 15 so As to output it to the product-sum register 15. By repeating this operation for obtaining such product and sum, a product-sum of signals input from the signal input terminal 16 and weights input from the input terminal of weights 17 is stored in the product-sum register 15, and the product-sum is output from the output terminal of product-sum 18.

Figures 3A, 3B:
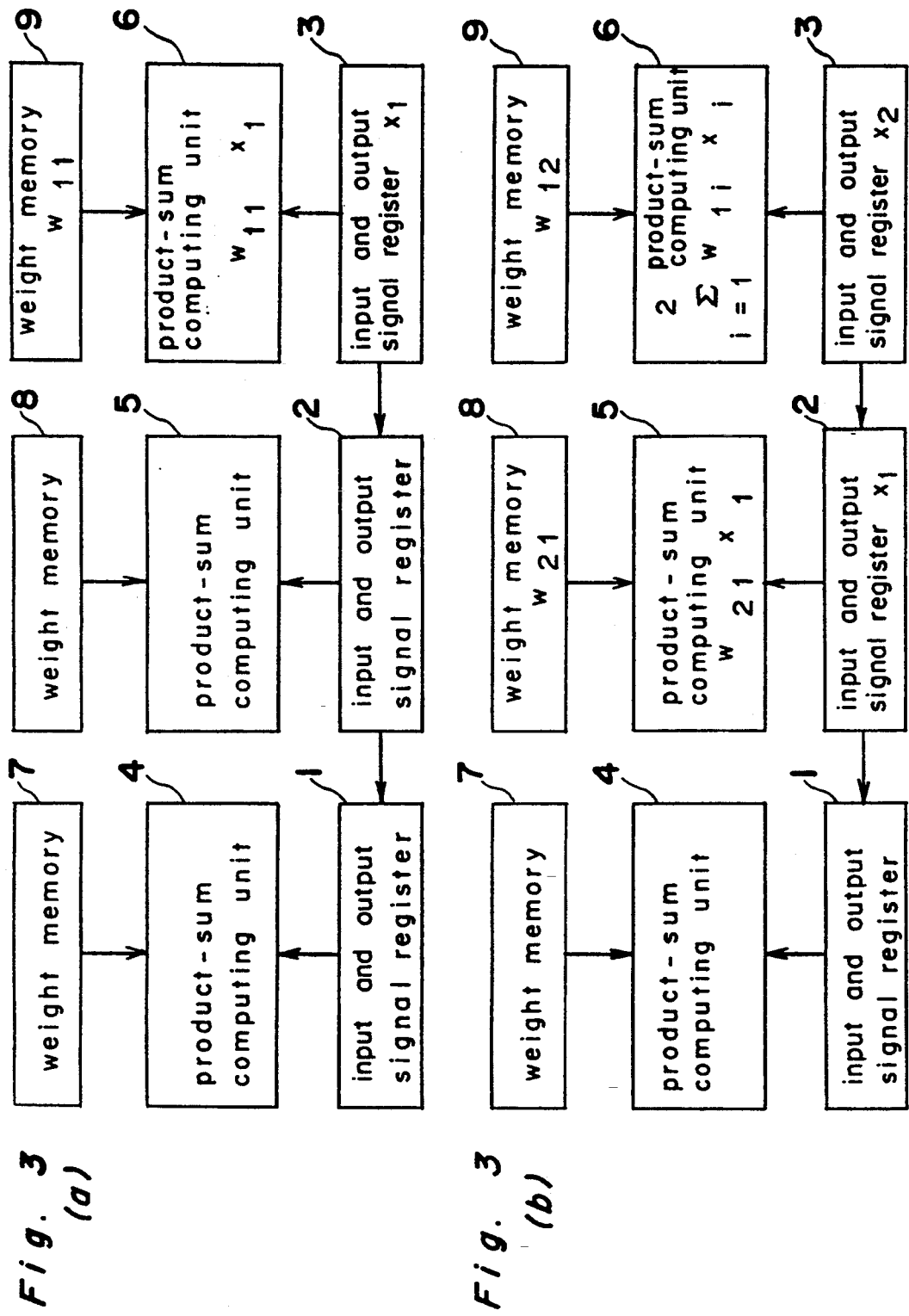

FIG. 3 shows the schematic diagram of the parallel processing of product-sum computing units 4, 5 and 6 in obtaining the outputs of the multi-input single-output circuits 68, 69 and 70 of the hidden layer 74. In FIG. 3, $X_1$ ($1 \leq i \leq 4$) is an input signal, $W_{ji}$ ($1 \leq i \leq 4$, $1 \leq j \leq 3$) is a weight to be multiplied at the j-th multi-input single-output circuit of the hidden layer 74 by the input single $X_i$. The weight memory 7 stores the weights $W_{3i}$ ($1 \leq i \leq 4$) to be multiplied at the third multi-input single-output circuit 70 of the hidden layer. The weight memory 8 stores the weights $W_{2i}$ ($1 \leq i \leq 4$) to be multiplied at the second multi-input single-output circuit 69 of the hidden layer. The weight memory 9 stores the weights $W_{1i}$ ($1 \leq i \leq 4$) to be multiplied at the first multi-input single-output circuit 68 of the hidden layer. An input signal $X_1$ is loaded to an input signal signal 12, and a signal switching unit 11 is set to transfer the output of the input signal register 12 into an input and output signal register 3. The product-sum registers of the product-sum computing units 4, 5 and 6 are initialized with zero. The operation of the product-sum computing unit 6 at the next machine.cycle is shown in the (a) of FIG. 3. The product-sum computing unit 6 obtains a product of the weight $W_{11}$ stored in the weight memory 9 and the input signal $X_1$ stored in the input and output signal register 3 so as to store it in the product-sum register of the product-sum computing unit 6. At this time, the input signal $X_2$ is loaded to the input signal register 12 simultaneously. The parallel processing of the product-sum computing units 5 and 6 at the next machine.cycle is shown in the (b) of FIG. 3. The product-sum computing unit 6 obtains a product $W_{122}$ of a signal $X_2$ stored in the input and output signal register 3 and a weight $W_{12}$ stored in the weight memory 9 so as to store the sum $$\sum_{i=1}^{2} W_{1i}X_i \tag{11}$$

with respect to $W_{11}X_1$ stored in the product-sum register. At the same time, the product-sum computing unit 5 obtains in the product $$W_{21}X_1 \tag{12}$$

At this time, the input signal $X_3$ is loaded to the input signal register 12 simultaneously. Likewise, the signals stored in the input signal register 12 and the input and output signal registers 3, 2, 1 are transferred in a sequence. The product-sum computing units 6, 5 and 4 obtain (see FIG. 3 (c), (d)) the product-sum of the weights stored in the weight memories 9, 8 and 7 at the signals stored in the input and output signal registers 3, 2 and 1. When the product-sum computing unit 6 obtains (see FIG. 3 (d))

$$\sum_{i=1}^{4} W_{1i}X_i \tag{13}$$

the product-sum computing unit 5 obtains at the next machine.cycle $$\sum_{i=1}^{4} W_{2i}X_i \tag{14}$$

and the product-sum computing unit 4 obtains at the next machine.cycle $$\sum_{i=1}^{4} W_{3i}X_i \tag{15}$$

In this manner, the product-sum computing units 6, 5 and 4 output to the sigmoid function computing unit 10 the product-sum in the multi-input single-output circuit of the hidden layer, being delayed respectively by 1 machine.cycle. The sigmoid function computing unit 10 obtains signals having a saturation characteristic given in the (formula 1) with respect to the input product-sum so as to output them to the signal switching unit 11, delayed respectively by one machine.cycle. They correspond to the output values of the multi-input single-output circuits of the hidden layer expressed by $$Y_1 = fnc\left(\sum_{i=1}^{4} W_{1i}X_i\right) \tag{16}$$

and $$Y_2 = fnc\left(\sum_{i=1}^{4} W_{2i}X_i\right) \tag{17}$$

and $$Y_3 = fnc\left(\sum_{i=1}^{4} W_{3i}X_i\right) \tag{18}$$

The output signals of the multi-input single-output circuits 68, 69 and 70 of the hidden layer 74 are obtained in such a manner as described hereinabove.

The signal switching unit 11 is set so that the output signals of the sigmoid function computing unit 10 may be transferred to the input and output signal register 3 when the output signals of the hidden layer 74 are input from the sigmoid function computing unit 10. Thus, the output $Y_j (1 \leq j \leq 3)$ of the sigmoid function computing unit 10 is transferred in a sequence to the input and output signal register 3. As the multi-input signal-output circuits composing the output layer are two in number S shown in FIG. 10, the product-sum in the multi-input single-output circuits of the output layer are obtained by the parallel processing of the product-sum computing units 6 and 5. The weight memory 8 stores weights $V_{2j}(1 \leq j \leq 3)$ to be multiplied at the second multi-input single-output circuit 72 of the output layer and the weight memory 9 stores the weights $V_{1j}(1 \leq j \leq 3)$ to be multiplied at the first multi-input single-output circuit 71 of the output layer. The product-sum computing unit 6 outputs to the sigmoid function computing unit 10, $$\sum_{j=1}^{3} V_{1j}Y_j. \tag{19}$$

Being delayed by 1 machine.cycle thereafter, the product-sum computing unit 5 outputs to the sigmoid function computing unit 10, $$\sum_{j=1}^{3} V_{2j}Y_j \tag{20}$$

The sigmoid function computing unit 10 obtains the sigmoid function given in the (formula 2) with respect to the product-sum so as to output them to the output layer $\delta$ calculating unit 35, delayed respectively by 1 machine.cycle. They correspond to the output values of the multi-input single-output circuits of the output layer expressed by $$z_1 = fnc\left(\sum_{j=1}^{3} V_{1j}Y_j\right) \tag{21}$$

and $$z_2 = fnc\left(\sum_{j=1}^{3} V_{2j}Y_j\right) \tag{22}$$

The output signals of the multi-input single-output circuits 71 and 72 of the output layer 75 are obtained as described hereinabove.

The output signals of the multi-input single-output circuits 71 and 72 of the output layer 75 to be obtained by the sigmoid function computing unit 10 are input in a sequence to the output layer $\delta$ calculating unit 35. The output layer $\delta$ calculating unit 35 obtains the back-propagating signal $\delta$ of the multi-input single-output circuit of the output layer in accordance with the (formula 23) dependent on the output signal $Z_k(1 \leq k \leq 2)$ of the multi-input single-output circuit of the output layer and a supervising signal $t_k (1 \leq k \leq 2)$.

$$\begin{aligned}\delta°_k &= (t_k - Z_k) Z'_k \\ &= (t_k - Z_k)(1 + Z_k)(1 - Z_k)/2\end{aligned} \tag{23}$$

In the (formula 23), $\delta°_k$ is a back-propagating signal of the k-th multi-input single-output circuit of the output layer, $Z_k$ is an output signal of the multi-input single-output circuit, $t_k$ is a supervising signal of the multi-input single-output circuit, $Z'_k$ is a differential of the sigmoid function of the multi-input single-output circuit. In the manner, the back-propagating signal δ of the multi-input single-output circuit of the output layer is obtained.

Figure 4A:
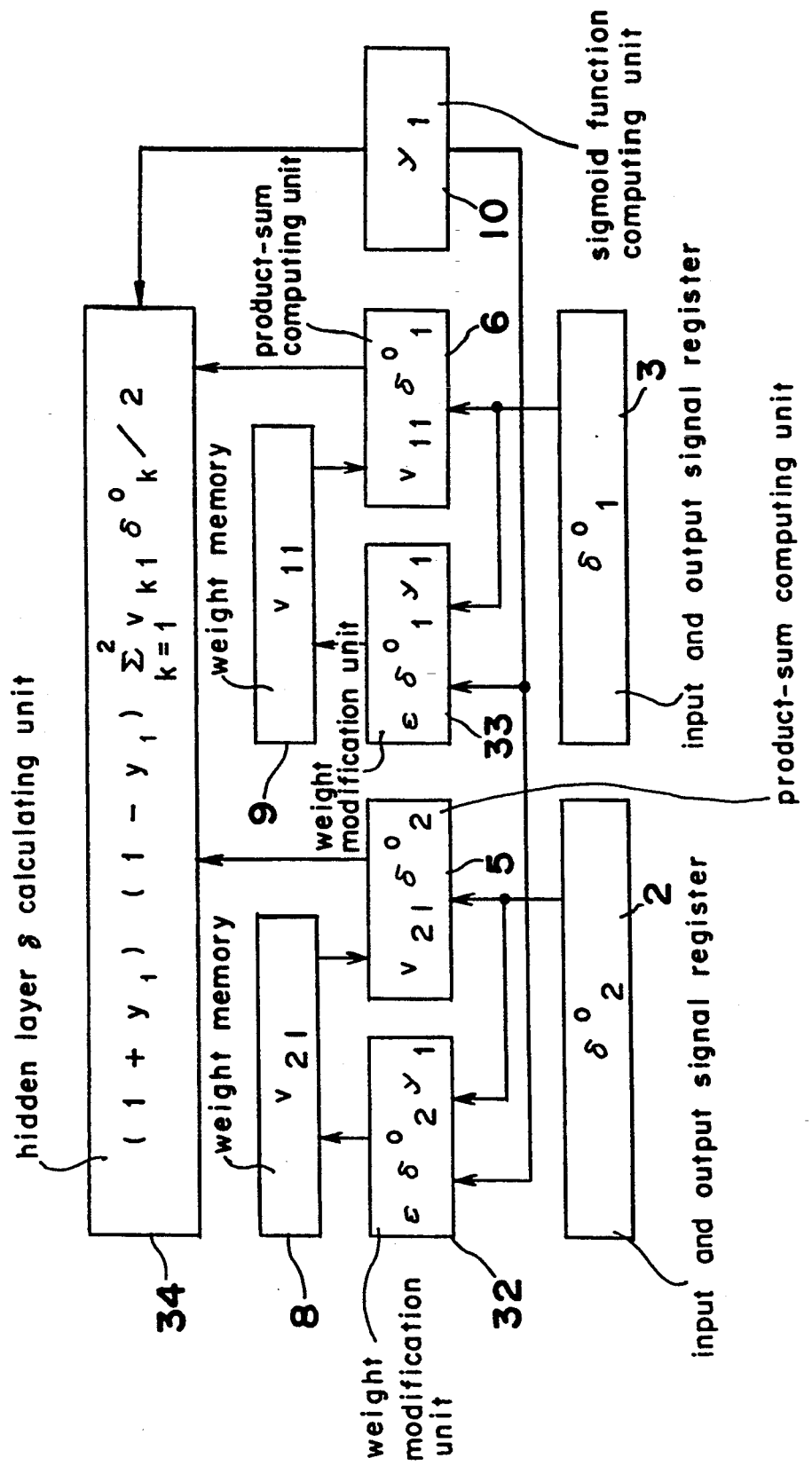
FIGS. 4a–4c show schematic diagrams of the parallel processing of product-sum computing units 5, 6 and weight modification units 32, 33 in the embodiment.
Figure 4B:
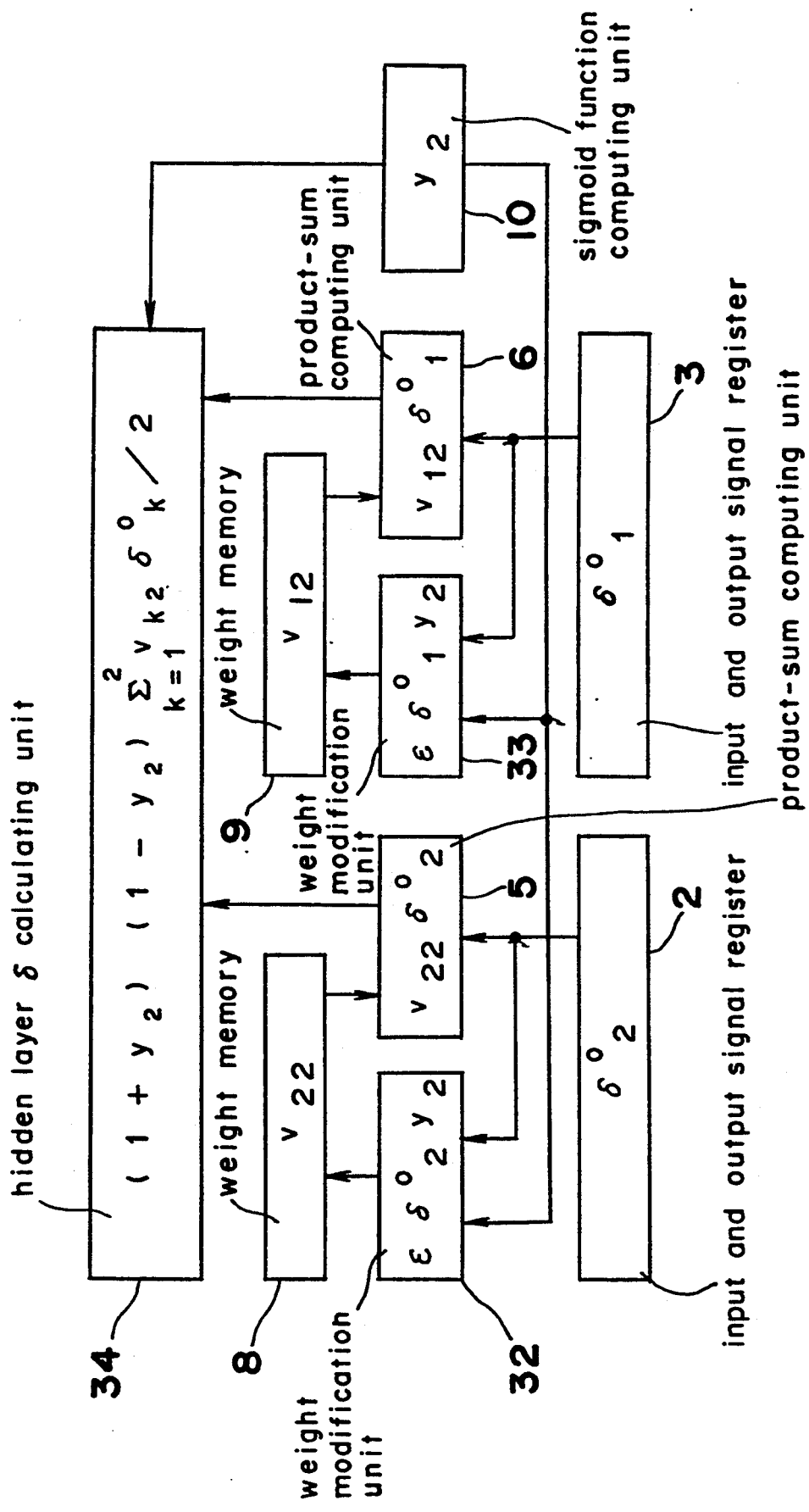
Figure 4C:
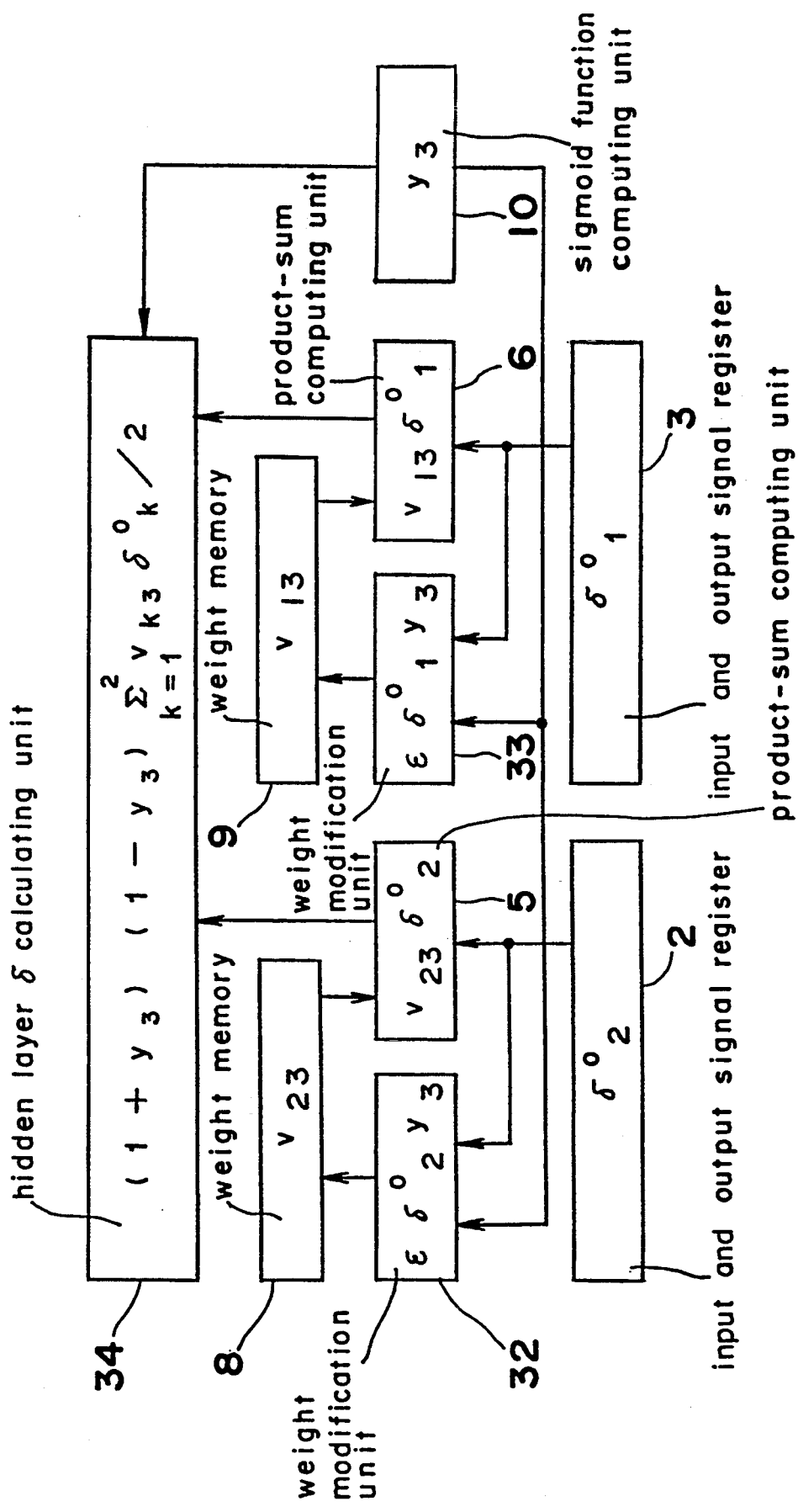

FIG. 4 shows schematic diagrams of the parallel processing of the product-sum computing units 5 and 6 and the weight modification units 32 and 33 in obtaining the back-propagating signal δ of the multi-input single-output circuit of the hidden layer and modifying the weights of the equivalent to the strength of the connections between the multi-input single-output circuits of the hidden layer and those of the output layer. In FIG. 4, $Y_j$ ($1 \leq j \leq 3$) is the output signal of the multi-input single-output circuit of the hidden layer, $V_{kj}$ ($1 \leq j \leq 3$, $1 \leq k \leq 2$) is the weights to be multiplied at the k-th multi-input single-output circuit of the output layer 75 by the output signal $Y_j$ of the multi-input single-output circuit of the hidden layer. The $\delta°_k$ ($1 \leq k \leq 2$) which is the back-propagating signal of the multi-input single-output circuit of the output layer is input to the signal switching unit 11 from the output layer δ calculating unit 35 in the order of $\delta°_2$, $\delta°_1$. At this time, the signal switching unit 11 is set so that the output of the output layer δ calculating unit 35 is transferred to the input and output signal register 3. In the order of the $\delta°_2$, $\delta°_1$, they are transferred to the input and output signal registers 3 and 2. At the moment when the $\delta°_2$ is loaded to the input signal register 2 and the $\delta°_1$ is loaded to the input and output signal register 3, the transferring of the signal between the input output signal registers is suspended. As described hereinabove, the weight memory 8 stores the weights $V_{2j}$ ($1 \leq j \leq 3$) equivalent to the strength of the connections between the second multi-input single-output circuit 72 of the output layer and the multi-input single-output circuit of the hidden layer, and the weight memory 9 stores the weights $V_{1j}$ ($1 \leq j \leq 3$) of the weights equivalent to the strength of the connections between the first multi-input single-output circuit 71 of the output layer and the multi-input single-output circuit of the hidden layer. FIG. 4 (a) shows schematic diagram of the parallel processing of the product-sum computing units 5 and 6 and the weight modification units 32 and 33 at this machine.cycle. A multiplier 13 in the product-sum computing unit 6 multiplies $\delta°_1$ to be output from the input and output signal register 3 by $V_{11}$ to be output from the weight memory 9 so as to output it to the hidden layer δ computing unit 34. At the same time, the multiplier 13 in the product-sum computing unit 5 multiplies $\delta°_2$ to be output from the input and output register 2 by $V_{21}$ to be output from the weight memory 8 so as to output it to the hidden layer δ calculating unit 34. In the hidden layer δ calculating unit 34, the sum of the two products $V_{11}\delta°_1$ and $V_{21}\delta°_2$ is obtained, and is multiplied by a differential $Y'_1$ of the sigmoid function of the first multi-input single-output circuit of the hidden layer so as to obtain the back-propagating signal of the first multi-input single-output circuit of the hidden layer.

$$\delta^h_1 = Y'_1 \sum_{k=1}^{2} \delta°_k V_{k1} \qquad (24)$$
$$= (1 + Y_1)(1 - Y_1) \sum_{K=1}^{2} V_{k1} \delta°_k / 2$$

At the same time, the output value $Y_1$ of the first multi-input single-output circuit of the hidden layer from the sigmoid function computing unit 10 is input to the weight modification units 33 and 32. In the weight modification unit 33, a learning rate ε is multiplied by a back-propagating signal $\delta°_1$ stored in the input and output signal register 3, and is multiplied by the output value $Y_1$ of the first multi-input single-output circuit of the hidden layer so as to obtain the modification amount of $V_{11}$ equivalent to the strength of the connections between the first multi-input single-output circuit of the hidden layer and the first multi-input single-output circuit of the output layer.

$$\Delta V_{11} = \epsilon \delta°_1 Y_1 \qquad (25)$$

At the same time, the modification amount of $V_{21}$ $$\Delta V_{21} = \epsilon \delta°_2 Y_1 \qquad (26)$$

is obtained in the weight modification unit 32. In the weight memories 9 and 8, the weights $V_{11}$ and $V_{21}$ are modified dependent on the amount of weight modification $\Delta V_{11}$ and $\Delta V_{21}$ to be output from the weight modification units 33 and 32. At the subsequent machine.cycle, as shown in FIG. 4, (b), (c), the sigmoid function computing unit 10 outputs output values $Y_2$ and $Y_3$ of the multi-input single-output circuit of the hidden layer in a sequence, with $\delta°_1$ and $\delta°_2$ which are the back-propagating signals of the multi-input single-output circuits of the output layer being retained in the input and output signal registers 3 and 2. The weight memories 33 and 32 output the corresponding weights in a sequence. The hidden layer δ calculating unit 34 obtains in a sequence $$\delta^h_j = Y'_j \sum_{k=1}^{2} \delta°_k V_{kj} \qquad (27)$$
$$= (1 + Y_j)(1 - Y_j) \sum_{k=1}^{2} \delta°_k V_{kj}/2$$
$$(2 \leq j \leq 3)$$

by the operation similar to that of the previous machine.cycle so as to modify in a sequence the weights $V_{kj}$ ($2 \leq j \leq 3$, $1 \leq k \leq 2$) in the weight memories 9 and 8. In a manner as described hereinabove, the back-propagating signal δ of the multi-input single-output circuit of the hidden layer is obtained so as to modify weights equivalent to the strength of the connections between the multi-input single-output circuits of the hidden layer and those of the output layer.

FIG. 5 shows schematic diagrams of the parallel processing of the weight modification units 31, 32 and 33 in the modification of the weights equivalent to the strength of the connections between the input terminals of the input layer and the multi-input single-output circuits of the hidden layer. In FIG. 5, $X_i$ ($1 \leq i \leq 4$) are the input signals from the input terminals and $W_{ji}$ ($1 \leq i \leq 4$, $1 \leq j \leq 3$) are the weights to be multiplied at the j-th multi-input single-output circuit of the hidden layer by the input signals $X_i$. $\delta^h_j$ ($1 \leq j \leq 3$) which are back-propagating signals of the multi-input single-output circuit of the hidden layer are input to a signal switching unit 11 from the hidden layer δ calculating unit 34 in the order of $\delta^h_3$, $\delta^h_2$, $\delta^h_1$. At this time, the signal switching unit 11 is set so that the output of the hidden layer δ calculating unit 34 may be transferred to the input and output signal register 3. It is transferred to the input and output signal registers 3, 2 and 1 in the order of the $\delta^h{}_3$, the $\delta^h{}_2$, the $\delta^h{}_1$. At a moment point when the $\delta^h{}_3$ is stored in the input and output signal register 1, the $\delta^h{}_2$ is stored in the input and output signal register 2 and the $\delta^h{}_1$ is stored in the input and output signal register 3, the transferring operation of the signal between the input and output signal registers is suspended. The schematic diagram of the parallel processing of the weight modification units 31, 32 and 33 at the next machine.cycle is shown in FIG. 5 (a). The first input signal $X_1$ is input from the input signal register 12 to the weight modification units 33, 32 and 31. In the weight modification unit 33, $\delta h_1$ stored in the input and output signal register 3 is multiplied by a learning rate $\epsilon$, and is multiplied by the first input signal $X_1$ so as to obtain the modification amount of $W_{11}$ $$\Delta W_{11} = \epsilon \delta^h{}_1 X_1 \tag{28}$$

equivalent to the strength of the connection between the first input terminal of the input layer and the first multi-input single-output circuit of the hidden layer. At the same time, the modification amount of $W_{j1}$ ($2 \leq j \leq 3$) is obtained in the weight modification units 32 and 31.

$$\Delta W_{j1} = \epsilon \delta^h{}_j X_1 \tag{29}$$

In the weight memories 9, 8 and 7, the weights $W_{j1}$ ($1 \leq j \leq 3$) are modified dependent on the amount of weight modification $\Delta W_{j1}$ ($1 \leq j \leq 3$) to be output from the weight modification units 33, 32 and 31. The schematic diagram of the parallel processing of the weight modification units 31, 32 and 33 at the subsequent machine.cycle is shown in FIG. 5 (b). The i-th input signal $X_i$ ($2 \leq i \leq 4$) are input from the input signal register 12 to the weight modification units 33, 32 and 31 so as to obtain the modification amount of $W_{ji}$ $$\Delta W_{ji} = \epsilon \delta^h{}_j X_i \; (2 \leq i \leq 4, \; 1 \leq j \leq 3) \tag{30}$$

In the weight memories 9, 8 and 7, the weights $W_{jk}$ are modified in accordance with the amount of modification $\Delta W_{ji}$ ($2 \leq i \leq 4$, $1 \leq j \leq 3$) to be output from the weight modification units 33, 32 and 31. In a manner as described hereinabove, the weights equivalent to the strength of the connections between the input terminals of the input layer and the multi-input single-output circuits of the hidden layer are modified.

FIG. 6 shows a time chart showing the temporal change of the computing units working in the learning machine in the present embodiment. Because the input signals are input in a sequence from the input signal register 12, only the product-sum computing unit 6 is working (see FIG. 3 (a)) at the first machine.cycle and the product-sum computing units 6 and 5 are working at the next machine.cycle (see FIG. 3 (b)). In such a manner as described hereinabove, the number of the product-sum computing units for carrying out the parallel processing operation changes to 1, 2, 3, 3 for each machine.cycle (see FIG. 3). At this time, the product-sum computing unit 6 outputs the product-sum to given in the (formula 13) and at the next machine.cycle, the sigmoid function computing unit 10 obtains in accordance with the (formula 16) the sigmoid function with respect to the product-sum to be expressed by the (formula 13). As the effective signal is not stored in the input and output register 3 at this time, the product-sum computing unit 6 is not working. Therefore, the number of the product-sum computing units for carrying out the parallel processing operation at this machine.cycle is 2.

In this manner, this time required for obtaining the output of the first multi-input single-output circuit of the hidden layer is machine.cycle × (number of signals of the input layer + 1) (31)

At the next machine.cycle, the sigmoid function computing unit 10 obtains the sigmoid function with respect to the (formula 14) in accordance with the (formula 17). The input and output signal register 3 stores the output signal of the first multi-input single-output circuit of the hidden layer. The product-sum computing unit 6 starts its computation of the product-sum of the first multi-input single-output circuit of the output layer. At this time, effective signal is not stored in the input and output signal register 2, and the product-sum computing unit 5 is not working. The product-sum computing unit 4 is computing the product-sum given in the (formula 15). Thus the number of the product-sum computing units for carrying out the parallel processing operation at this machine.cycle is 2. The output signal of the multi-input signal-output circuit of the hidden layer is transferred in a sequence by the input and output signal registers 3 and 2 from the next machine.cycle. The number of the product-sum computing units for carrying out the parallel processing operation is 2, 2 for each machine.cycle and then the product-sum computing unit 6 outputs the product-sum given in with the (formula 19). At the next machine.cycle, the sigmoid function computing unit 10 obtains in accordance with the (formula 21) the sigmoid function with respect to the product-sum given in the (formula 19). At this time, effective signal is not stored at the input and output register 3 and the product-sum computing unit 6 is not working. Hence, the number of the product-sum computing units for carrying out the parallel processing operation at this machine.cycle is 1. Thereafter, for obtaining, in accordance with the (formula 22), the sigmoid function with respect to the product-sum given in the (formula 20), one machine.cycle is required. Thus, the time required for obtaining the outputs of all the multi-input single-output circuits of the output layer is machine.cycle × (number of output signals of the hidden layer + number of output signals of the output layer) (32)

Then, the back-propagating signals of the multi-input signal-output circuits of the output layer are obtained in the order of $\delta°_1$, $\delta°_2$ in the output layer $\delta$ calculating unit 35. The obtained back-propagating signals are transferred to the input and output signal register in the order of $\delta°_2$, $\delta°_1$ with the order being reversed. At the next machine.cycle, the back-propagating signal of the first multi-input single-output circuit in the hidden layer is obtained, and at the same time, the weights equivalent to the strength of the connections between the first multi-input single-output circuit of the hidden layer and the multi-input single-output circuits of the output layer are modified (see FIG. 4 (a)). The computing units working at this time are the product-sum computing units 6, 5, the hidden layer $\delta$ calculating unit 34 and the weight modification units 33, 32. In this manner, the back-propagating signals of the output layer are transferred to the input and output signal registers, and the back-propagating signals of the hidden layer are calculated. The time required for obtaining the back-propagating signals of the hidden layer is machine.cycle×(number of output signals of the hidden layer+number of output signals of the output layer+1) (33)

The back-propagating signals of the multi-input single-output circuits of the hidden layer obtained in this manner are transferred to the input and output signal register in the order of $\delta h_3$, $\delta h_2$, $\delta h_1$. At the next machine.cycle, the weights equivalent to the strength of the connections between the first input terminal of the input layer and the multi-input single-output circuits of the hidden layer (see FIG. 5 ($a$)) are modified. The computing units working at this time are the product-sum computing units 6, 5, 4 and the weight modification units 33, 32, 31. In this manner, the back-propagating signals of the hidden layer are transferred to the input and output signal registers, and the weights for connecting the input layer with the hidden layer are modified. The time required for the transferring and the modifying is machine.cycle×(number of signals of the input layer+number of output signals of the hidden layer) (34)

Following the above operation, the time required for obtaining the output signal of the output layer from the input signal is machine.cycle×(number of signals of the input layer+number of output signals of the hidden layer+number of output signals of the output layer+1) (35)

Also, the time required for the weight modification to be completed after the moment when the output signal of the output layer is obtained is machine.cycle×{number of signals of the input layer+2×number of output signals of the hidden layer+number of output signals of the output layer+1} (36)

According to the present embodiment as described hereinabove, from the input signal register 12, the input signals are input in a sequence, the signals are transferred in a sequence by the input and output signal registers 3, 2 and 1 and the product-sum computing units 6, 5 and 4 for carrying out the parallel processing operation output the product-sum of the multi-input single-output circuits with delay of one machine.cycle respectively. Thus, the sigmoid function computing unit 10 may be reduced to one. In the present embodiment, the time given in the (formula 35) is required to obtain the output signal from the input signal. The increase in the time for calculating the output signal, due to the reduction in the number of the sigmoid function computing units, as compared with the required time given in the (formula 7) in the conventional embodiment is ti machine.cycle×(number of output signals of the output layer+1)−(time for computing the sigmoid function of the hidden layer and the output layer) (37)

In the conventional learning machine, one machine.cycle is required for the computing the sigmoid function of the hidden layer and the output layer respectively. In the present embodiment and the conventional embodiment, when 2 is substituted to the number of output signals of the output layer, the increase in time for calculating the output signal is one machine.cycle. The first effect of the present embodiment is that the learning machine smaller in scale than before may be realized with small increase of the time for obtaining the output signals.

The second effect of the present embodiment is that the time required before the weight modification is completed after the output signal of the output layer is obtained can be shortened by the parallel processing of the product-sum computing units 4, 5, 6, the weight modification units 31, 32, 33 and the hidden layer $\delta$ calculating unit 34. The time required after the output signal of the output layer is obtained before the weight modification is completed is shortened down to the time given in the (formula 36) in the present embodiment compared with the (formula 10) in the conventional embodiment. When the number of signals in the input layer being 4, the number of output signals of the hidden layer being 3, the number of output signals of the output layer being 2 are substituted into the (formula 10) and the (formula 36), the time to be shortened is machine.cycle×4 (38)

In the present embodiment, although the product-sum computing unit 6 obtains the product-sum of the first multi-input single-output circuit of the output layer given in the (formula 19), it may be given as $$V_{10} + \sum_{j=1}^{3} V_{1j}Y_j \qquad (39)$$

The $V_{10}$ is a threshold value of the first multi-input single-output circuit of the output layer. When such computing operation is carried out, 1 is transferred to an input and output signal register 3 through a signal switching unit 11 from the input signal register 12 so as to obtain the product of 1 and $V_{10}$ in the product-sum computing unit 6. According to such an operation, in FIG. 6, waiting time for computing the sigmoid function is removed.

In the present embodiment, although the back-propagating signals obtained by an output layer $\delta$ calculating unit 35 are transferred to the input and output signal register 3 in the order of $\delta°_2$, $\delta°_1$, they may be transferred to the input and output signal register 2 in the order of $\delta°_1$, $\delta°_2$ and they may be transferred to the input and output signal register 3 from the input and output signal register 2. According to such an operation, in FIG. 6, the waiting time for transferring $\delta$ is removed. According to the method, the time required before the weight modification is completed after the output signal of the output layer is obtained can be shortened to machine.cycle×(number of signals of the input layer+number of output signals of the hidden layer) (40)

By the comparison of the time given in the (formula 10) with that given in the (formula 40) required in the conventional embodiment, the number of signals of the input layer being 4, the number of output signals of the hidden layer being 3, the number of output signals of the output layer being 2, the shortened time is Machine.cycle×10 (41)

Figure 7:
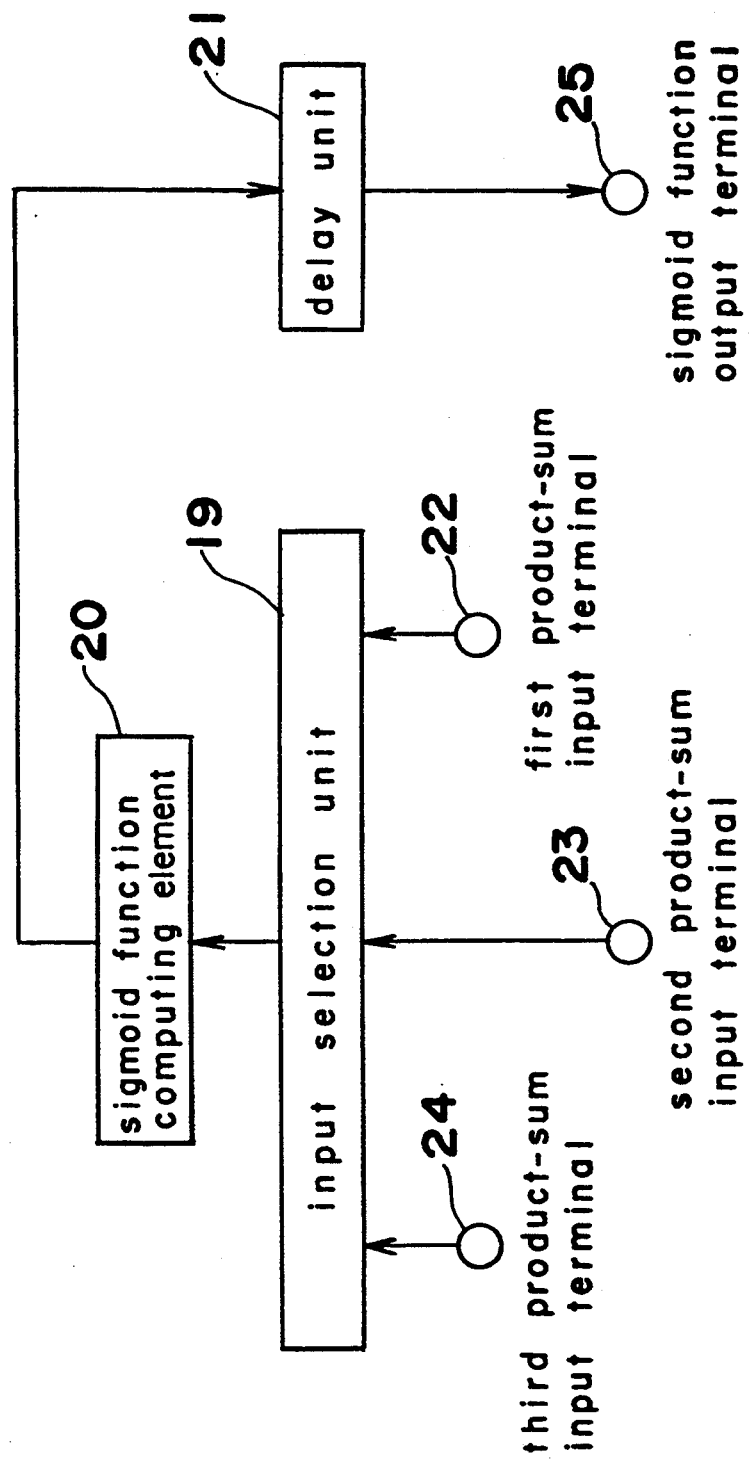
FIG. 7 is a block diagram of a learning machine in another embodiment of a present invention.
Figure 8:
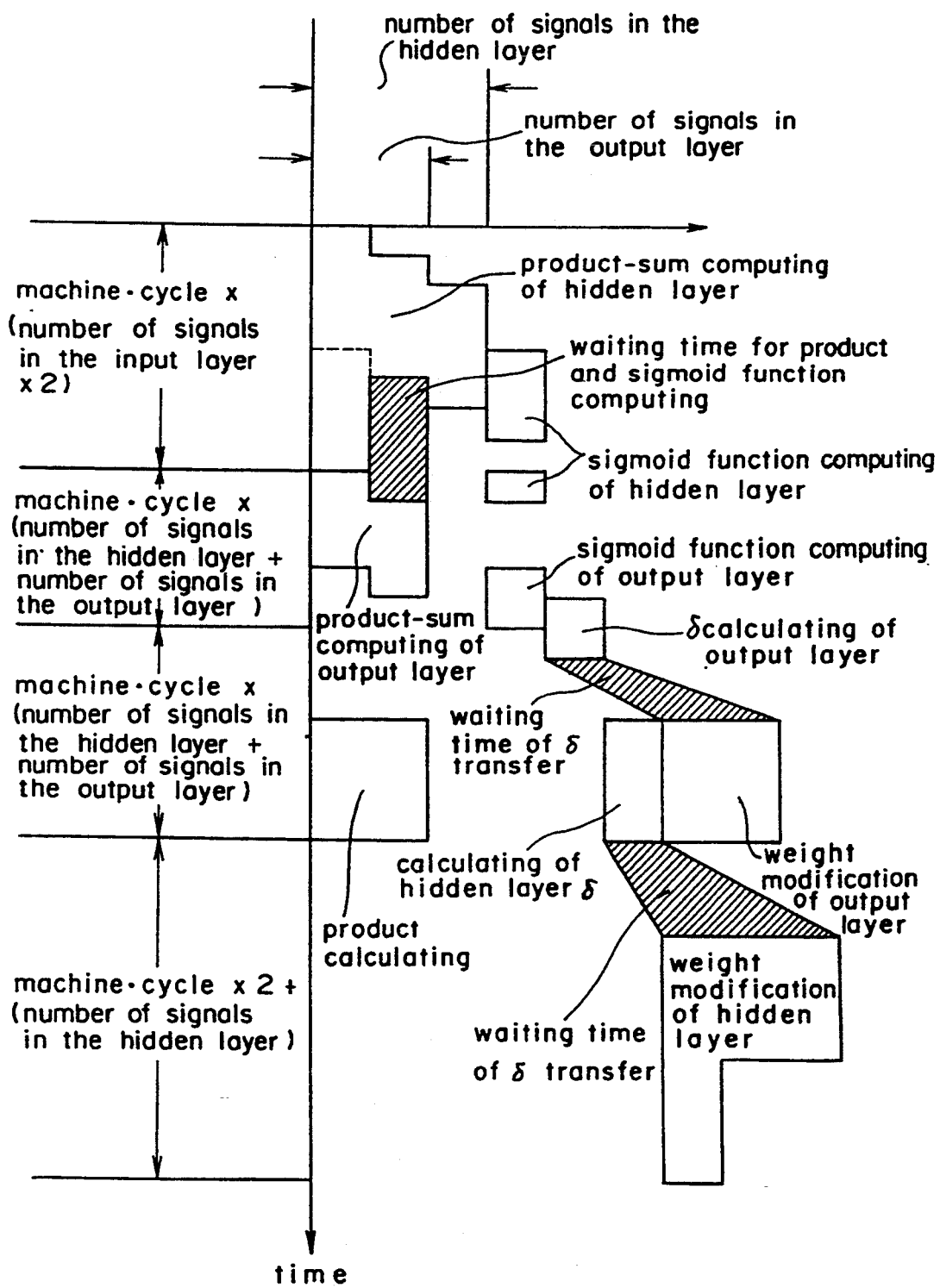
FIG. 8 is a time chart showing the temporal change of the computing units working in the learning machine of the embodiment.
Figure 9:
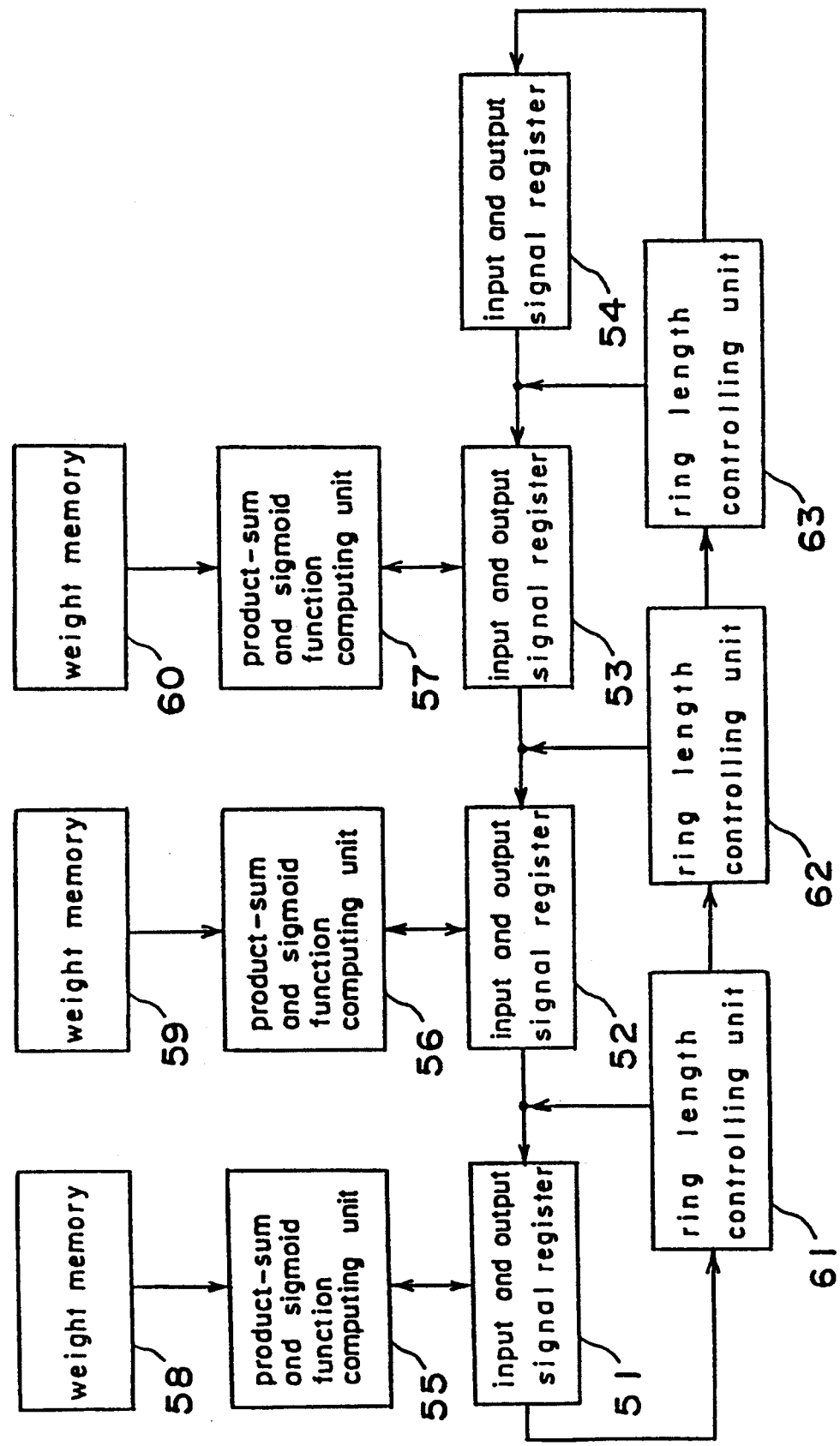
FIG. 9 is a block diagram of the conventional learning machine.

FIG. 7 is a block diagram of the sigmoid function computing unit 10 in a learning machine in another embodiment of the present invention having the whole construction of FIG. 1. In FIG. 7, reference numeral 19 denotes an input selection unit, reference numeral 20 denotes a sigmoid function computing element, reference numeral 21 denotes a delay unit, reference numeral 22 denotes a first product-sum input terminal, reference numeral 23 denotes a second product-sum input terminal, reference numeral 24 denotes a third product-sum input terminal. In this embodiment of the present invention, a sigmoid function computing unit 10 is provided with a delay unit 21 with which the embodiment is provided.

An effect in the present embodiment is that a learning machine of various construction with the number of the input signals, and the multi-input single-output circuits of the hidden layer and the output layer being different may be realized by the adjustment of the delay time in the delay unit 21. When the delay time is made zero, a learning machine of an input signal 4, a multi-input single-output circuit 3 of the hidden layer, a multi-input single-output circuit 2 of the output layer can be realized by the same operation as the previsous embodiment.

In the description of operation of the present embodiment hereafter, it is shown how the learning machine with 4 input signals, 4 multi-input single-output circuits of the hidden layer, 2 multi-input single-output circuits of the output layer may be realized by the adjustment of the delay time of the delay unit 21 without changing the construction.

FIG. 7 shows a time chart showing the time temporal of the computing unit working in the learning machine in the present embodiment. As four input signals are input in a sequence from the input signal register 12, only the product-sum computing unit 6 operates at the first machine.cycle, and the product-sum computing units 6 and 5 works at the next machine.cycle. In such a manner, the product-sum computing units 6, 5 and 4 compute the product-sum in the first, second and third multi-input single-output circuits. The number of the product-sum computing units for carrying out the parallel processing operation is changed to 1, 2, 3, 3 for each machine.cycle, and at this time point, the product-sum computing unit 6 outputs the product-sum.

$$\sum_{i=1}^{4} w_i x_i \qquad (42)$$

In order to compute the product-sum of the fourth multi-input single-output circuit of the hidden layer, the input signal $X_1$ from the input signal register 12 is transferred to the input and output signal register 3 again through the signal switching unit 11 at the next machine.cycle. At the same time, the input signal $X_2$ is loaded to the input signal register 12. At this machine..cycle, the output (formula 42) of the product-sum computing unit 6 is selected by the input selecting unit 19 in the sigmoid function computing unit 10. The sigmoid function computing element 20 computes the sigmoid function with respect to the product-sum. As the signal switching unit 11 is set so that the signal from the input signal register 12 is transferred to the input and output signal register 3 at this machine.cycle, the output of the sigmoid function computing element 20 is delayed by the delay unit 21 till the signal switching unit 11 is set so that the output of the sigmoid function computing unit 10 may be transferred to the input and output signal register 3. This delay time is necessary, when the number (four) of the multi-input single-output circuits of the hidden layer 74 is more than the number (three) of the product-sum computing units, in this case the product-sum of the multi-input single-output circuits of the hidden layer are obtained in the parallel processing of more than one by the product-sum computing units. In this case, the input signals are transferred to the input and output signal register 3 more than one from the input signal register 12, and the output of the multi-input single-output circuit of the hidden layer obtained previously during the transferring operation is required to be stored in the sigmoid function computing unit 10. In the sigmoid function computing unit 10 from the next machine.cycle, the input selecting unit 19 selects the outputs of the product-sum computing units 5, 4 in a sequence, and the sigmoid function computing element 20 obtains in a sequence the sigmoid function with respect to the these product-sums. The signal (namely, the output of the multi-input single-output circuit of the hidden layer) of the sigmoid function is delayed in a sequence by the delay unit 21 till the signal switching unit 11 is set so that the output of the sigmoid function computing unit 10 is transferred to the input and output signal register 3. While the product-sum of the fourth multi-input single-output circuit of the hidden layer is computed, the product-sum computing units 5 and 4 are not operated after the outputs of the second and third multi-input single-output circuits of the hidden layer are obtained. In this manner, the time required for obtaining the product-sum of all the multi-input single-output circuits of the hidden layer from the input signals is $$\text{machine.cycle} \times \text{number of signals in the input layer} \times 2 \qquad (43)$$

When the product-sum computing unit 6 completes the computing of the product-sum of the fourth input single-output circuit of the hidden layer, the signal switching unit 11 is set to transfer the output of the sigmoid function computing unit 10 to the input and output signal register 3. At the next machine.cycle, the sigmoid function computing unit 10 computes the sigmoid function with respect to the product-sum of the fourth multi-input single-output circuit of the hidden layer, and at the same time, the output of the first multi-input single-output circuit of the hidden layer is transferred to the input and output signal register 3. Thereafter, in the input and output signal registers 3 and 2, the output signals of the multi-input single-output circuits of the hidden layer are transferred in a sequence. The product-sums of the multi-input single-output circuit of the output layer are obtained in the product-sum computing units 6 an 5. Accordingly, the delay time in the delay unit 21 is $$\text{machine.cycle} \times 3 \qquad (44)$$

for the outputs of the first, second and third multi-input single-output circuit of the hidden layer. It is $$\text{machine.cycle} \times 2 \qquad (45)$$

for the output of the fourth multi-input single-output circuit of the hidden layer. In the sigmoid function computing unit 10, the sigmoid functions given in the (formula 2) are sequentially obtained with respect to the product-sum of the multi-input single-output circuit of the output layer, and the output of the multi-input single-output circuit of the output layer is obtained. In this manner, the time required for the outputs of all the multi-input single-output circuits of the output layer to be output after the product-sum of all the multi-input single-output circuits of the hidden layer are calculated is machine.cycle × (the number of output signals of the hidden layer + the number of output signals of the output layer)     (46)

The calculation of the back-propagating signal $\delta$ of the multi-input single-output circuit of the hidden layer and the modification of weights equivalent to the strength of the connections between the multi-input single-output circuits of the hidden layer and those of the output layer are carried out by the same operation as the previous embodiment of the present invention shown in FIG. 4. The back-propagating signals of the multi-input single-output circuits of the hidden layer are transferred to the input and output signal register in the order of $\delta h_3$, $\delta h_2$, $\delta h_1$. The modification of weights equivalent to the strength of the connections between the first through third multi-input single-output circuits of the hidden layer and the input terminals of the input layer are carried out by the same operation as the previous embodiment of the present invention shown in FIG. 5. Thereafter, the back-propagating signal $\delta$ of the fourth multi-input single-output circuit of the hidden layer is transferred to the input and output signal register. The modification of weights equivalent to the strength of the connections between the fourth multi-input single-output circuit of the hidden layer and the input terminal, of the input layer is carried out by the same operation. The time to be required after all the weight modifications of the output layer are completed before the completion of all the weight modifications of the hidden layer is Machine.cycle × (2 × number of signals in the input layer + number of output signals of the hidden layer)     (45)

According to the present embodiment as described hereinabove, the input signals are input in a sequence from the input signal register 12. In the input and output signal registers 3, 2 and 1, the signals are transferred in a sequence, so that the product-sum computing units 6, 5 and 4 for carrying out the parallel processing output the product-sum of the multi-input single-output circuits with the delay by one machine.cycle respectively. Thus, the sigmoid function computing unit 10 may be one. Therefore, the scale of the circuit of the learning machine may be made smaller than the conventional learning machine. Also, in the sigmoid function computing unit 10, the delay unit 21 adjusts the delay time for the output of the sigmoid function computing element 20, so that learning machines which vary in number of the input signals, number of the multi-input single-output circuits of the hidden layer and the output layer may be constructed.

As is clear from the foregoing description, according to the arrangement of the present invention, the sigmoid function computing unit may be one in number, and the scale of the circuit of the learning machine may be made smaller. Also, according the present invention, the weights may be modified in the short time. Also, according to the present invention, the learning machines which differ in the number of the input signals, the number of the multi-input single-output circuits of the hidden layer and the output layer may be realized with a simple change of the setting.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A learning machine comprising:
   a plurality of input-output signal registers connected in cascade,
   a plurality of weight memories for simultaneously outputting a plurality of weights, each of said weights to be multiplied by an output of a respective one of said plurality of input-output registers,
   a plurality of product-sum computing units each of which receives at different machine cycles a) an output signal of a respective one of said plurality of input-output signal registers and b) the weight stored in a respective one of said plurality of weight memories, each of said plurality of product-sum computing units for generating a product-sum,
   a single sigmoid function computing unit receiving product-sums at different machine cycles from all of Said plurality of product-sum computing units, said sigmoid function computing unit outputting output signals having a saturation characteristic with respect to each product-sum which is outputted by every one of said plurality of product-sum computing units.

2. A learning machine comprising:
   a plurality of input-output signal registers connected in cascade and generating a plurality of output signals,
   a plurality of weight memories for simultaneously outputting a plurality of weights, each of said weights to be multiplied by an output of a respective one of said plurality of input-output registers,
   a plurality of product-sum computing units each of which receives at different machine cycles a) an output signal of a respective one of said plurality of input-output signal registers and b) the weight stored in a respective one of said plurality of weight memories, each of said plurality of product-sum computing units for generating a product sum,
   a single sigmoid function computing unit receiving product-sums at different machine cycles from all of said plurality of product-sum computing units, said sigmoid function computing unit outputting output signals having a saturation characteristic with respect to each product-sum which is outputted by every one of said plurality of product-sum computing units,
   an output layer delta computing unit for computing a back-propagating signal delta of an output layer which is dependent on a) an output signal of the sigmoid function computing unit and b) a supervising signal of the sigmoid function computing unit,
   a hidden layer delta computing unit for computing a back-propagating signal delta of a hidden layer in accordance with the product which is generated by the product-sum computing unit, a weight modification unit for determining an amount of weight modification dependent on said plurality of output signals generated by said plurality of input-output signal registers, the back-propagating signal delta of the output layer delta computing unit and the back-propagating signal delta of the hidden layer delta computing unit, the amount of weight being modifiable.

3. A learning machine described in accordance with claim 1 or claim 2, wherein said single sigmoid function computing unit comprises:

a single sigmoid function element for outputting signals having a saturation characteristic with respect to each input signal received from said input selecting unit, an input selecting unit for selecting one output signal of said plurality of product-sum computing units so as to input said one output signal into the sigmoid function element, a delay element for delaying the output signals of the sigmoid function element, wherein a change in structure of the learning machine is realized by a change of delay time in the delay element.

* * * * *